(12) United States Patent
Sato et al.

(10) Patent No.: US 10,523,484 B2
(45) Date of Patent: Dec. 31, 2019

(54) WIRELESS COMMUNICATION DEVICE, COMMUNICATION SYSTEM, AND INFORMATION PROCESSING METHOD

(71) Applicant: SONY CORPORATION, Tokyo (JP)

(72) Inventors: Masanori Sato, Tokyo (JP); Katsutoshi Itoh, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/541,134

(22) PCT Filed: Nov. 13, 2015

(86) PCT No.: PCT/JP2015/081949
§ 371 (c)(1),
(2) Date: Jun. 30, 2017

(87) PCT Pub. No.: WO2016/117215
PCT Pub. Date: Jul. 28, 2016

(65) Prior Publication Data
US 2017/0373899 A1 Dec. 28, 2017

(30) Foreign Application Priority Data
Jan. 22, 2015 (JP) ................................ 2015-009916

(51) Int. Cl.
| | | |
|---|---|---|
| H04L 27/26 | (2006.01) | |
| H04W 4/38 | (2018.01) | |
| H04W 4/08 | (2009.01) | |
| H04W 72/04 | (2009.01) | |
| H04W 4/02 | (2018.01) | |

(52) U.S. Cl.
CPC .......... *H04L 27/2611* (2013.01); *H04W 4/02* (2013.01); *H04W 4/08* (2013.01); *H04W 4/38* (2018.02); *H04W 72/04* (2013.01)

(58) Field of Classification Search
CPC . H04W 16/30; H04W 72/02; H04W 72/0453; H04W 72/085; H04W 72/1231
See application file for complete search history.

(56) References Cited

U.S. PATENT DOCUMENTS

| | | | |
|---|---|---|---|
| 5,745,483 A | 4/1998 | Nakagawa et al. | |
| 2008/0240009 A1* | 10/2008 | Min .................... | H04W 52/286 370/311 |

(Continued)

FOREIGN PATENT DOCUMENTS

| | | |
|---|---|---|
| CN | 101911810 A | 12/2010 |
| CN | 102893657 A | 1/2013 |

(Continued)

OTHER PUBLICATIONS

International Search Report and Written Opinion of PCT Application No. PCT/JP2015/081949, dated Feb. 2, 2016, 02 pages of English Translation and 07 pages of ISRWO.

(Continued)

*Primary Examiner* — Pao Sinkantarakorn
(74) *Attorney, Agent, or Firm* — Chip Law Group

(57) ABSTRACT

Appropriate data communication is realized. A wireless communication device includes a communication unit and a control unit. The communication unit included in the device performs data transmission to a different device via one of frequency channels classified into a plurality of groups that includes a first group and a second group. On the other hand, the control unit detects a reference signal transmitted from the different device via one of the frequency channels belonging to the first group. The control unit further selects one of the frequency channels for the data transmission from the first group or the second group on the basis of a result of detection of the reference signal.

16 Claims, 16 Drawing Sheets

(56) References Cited

U.S. PATENT DOCUMENTS

| | | | |
|---|---|---|---|
| 2009/0175324 A1 | 7/2009 | Sampath et al. | |
| 2009/0180429 A1* | 7/2009 | Stevens | H04L 5/0023 370/329 |
| 2011/0282989 A1 | 11/2011 | Geirhofer et al. | |
| 2013/0130708 A1 | 5/2013 | Chhaya et al. | |
| 2016/0143034 A1 | 5/2016 | Mochizuki | |
| 2016/0192255 A1* | 6/2016 | Tsuda | H04W 16/08 370/331 |

FOREIGN PATENT DOCUMENTS

| | | |
|---|---|---|
| EP | 2077693 A1 | 7/2009 |
| JP | 3043958 B2 | 5/2000 |
| JP | 2004-146883 A | 5/2004 |
| JP | 2011-509601 A | 3/2011 |
| JP | 2011-188338 A | 9/2011 |
| JP | 2013-529032 A | 7/2013 |
| JP | 6103053 B2 | 3/2017 |
| KR | 10-2010-0096278 A | 9/2010 |
| KR | 10-2013-0039735 A | 4/2013 |
| WO | 2009/088740 A1 | 7/2009 |
| WO | 2011/143496 A1 | 11/2011 |
| WO | 2014/203546 A1 | 12/2014 |

OTHER PUBLICATIONS

Extended European Search Report of EP Patent Application No. 15878904.0, dated Aug. 16, 2018, 07 pages.

* cited by examiner

RECEPTION PERFORMANCE COMPARISON EXAMPLE
BETWEEN WIRELESS COMMUNICATION DEVICE AND BASE STATION

FRAME FORMAT CONFIGURATION EXAMPLE

FIG. 6

GROUP CLASSIFICATION EXAMPLE OF FREQUENCY
CHANNELS USABLE BY COMMUNICATION SYSTEM

| BASIC GROUP (FREQUENCY CHANNEL GROUP) | BACKUP GROUP (FREQUENCY CHANNEL GROUP) |
|---|---|
| $f1, f2, \cdots, fm$ | $fm+1, fm+2, \cdots, fn$ |

FIG. 8

GROUP CLASSIFICATION EXAMPLE OF FREQUENCY
CHANNELS USABLE BY COMMUNICATION SYSTEM

| BASIC GROUP (FREQUENCY CHANNEL GROUP) | FIRST BACKUP GROUP (FREQUENCY CHANNEL GROUP) | SECOND BACKUP GROUP (FREQUENCY CHANNEL GROUP) |
|---|---|---|
| f1, f2, ···, fm1 | fm1+1, fm1+2, ···, fm2 | fm2+1, fm2+2, ···, fn |

RECEIVABLE RANGE DISTRIBUTION EXAMPLE OF RESPECTIVE
GROUPS ASSOCIATED WITH WIRELESS COMMUNICATION DEVICE 100

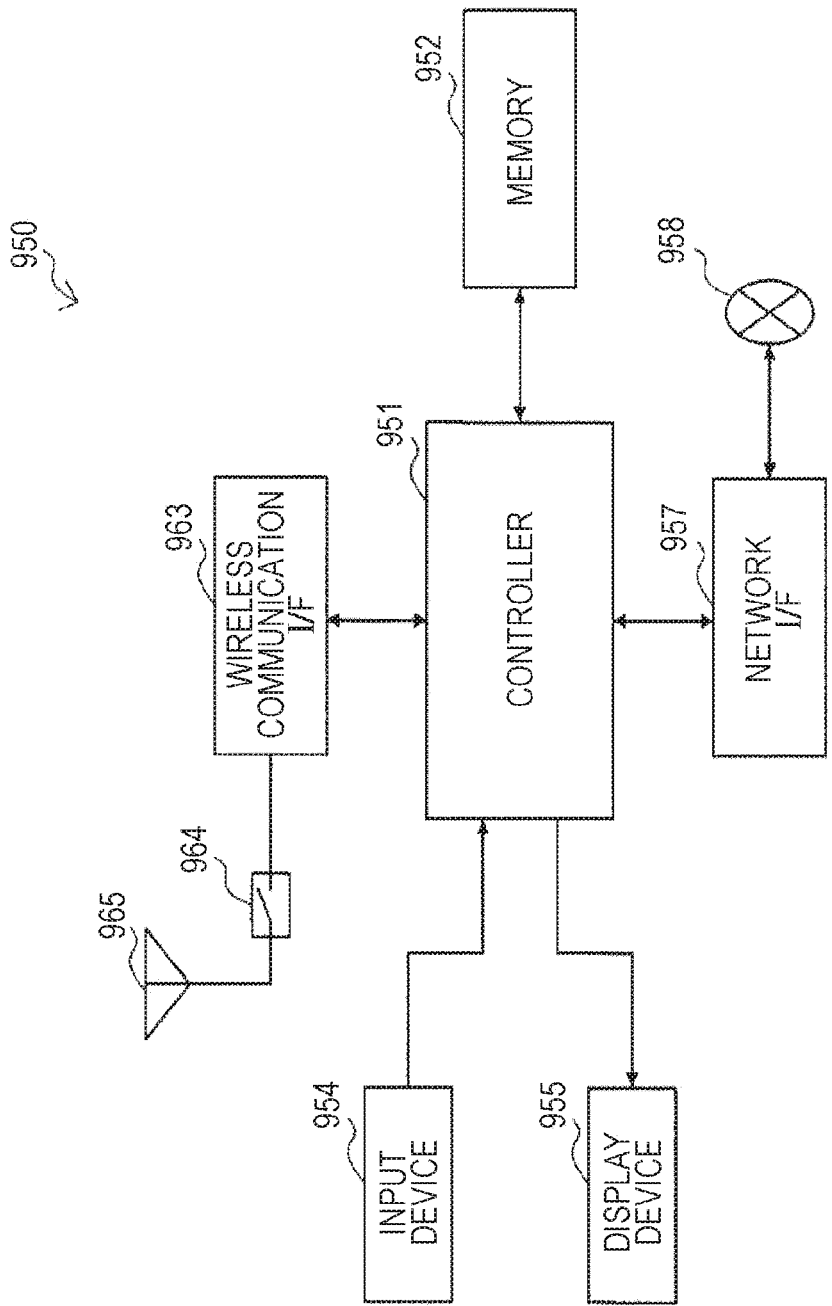

WIRELESS COMMUNICATION DEVICE, COMMUNICATION SYSTEM, AND INFORMATION PROCESSING METHOD

CROSS REFERENCE TO RELATED APPLICATIONS

This application is a U.S. National Phase of International Patent Application No. PCT/JP2015/081949 filed on Nov. 13, 2015, which claims priority benefit of Japanese Patent Application No. JP 2015-009916 filed in the Japan Patent Office on Jan. 22, 2015. Each of the above-referenced applications is hereby incorporated herein by reference in its entirety.

TECHNICAL FIELD

The present technology relates to a wireless communication device. More specifically, the present technology relates to a wireless communication device, a communication system, and an information processing method for handling information concerning wireless communication, and a program under which a computer executes this information processing method.

BACKGROUND ART

There have been wireless communication technologies for exchanging various types of data by use of wireless communication. For example, there has been proposed a wireless transmitter which determines transmission intervals of transmission data, and wirelessly and intermittently transmits transmission data at the determined transmission intervals (for example, see Patent Document 1).

CITATION LIST

Patent Document

Patent Document 1: Japanese Patent Application Laid-Open No. 2011-188338

SUMMARY OF THE INVENTION

Problems to be Solved by the Invention

According to this conventional technology, data communication between a plurality of devices is realizable by using intermittent wireless transmission of transmission data.

Suppose herein that data communication is performed by use of wireless communication between devices having different levels of reception performance, for example. In this case, the device having low reception performance in the devices has a relatively narrow communicative range. It is essential, however, that each of the devices should perform appropriate data communication even during data communication by wireless communication between the devices having different levels of reception performance.

The present technology has been developed in consideration of the aforementioned circumstances. It is an object of the present technology to realize appropriate data communication.

Solutions to Problems

The present technology has been developed to solve the aforementioned problems. A first aspect of the present technology is directed to a wireless communication device, an information processing method for this device, and a program under which a computer executes this method, the device including: a communication unit that performs data transmission to a different device via one of frequency channels classified into a plurality of groups that includes a first group and a second group; and a control unit that selects one of the frequency channels for the data transmission from the first group or the second group on the basis of a result of detection of a reference signal transmitted from the different device via one of the frequency channels belonging to the first group. According to an effect offered by this configuration, one of the frequency channels for the data transmission is selected from the first group or the second group on the basis of the result of detection of the reference signal transmitted from the different device via one of the frequency channels belonging to the first group.

In addition, in the first aspect, the control unit may compare a threshold and reception power of the reference signal received via one of the frequency channels belonging to the first group, and determine whether to select the corresponding frequency channel on the basis of a result of the comparison. According to an effect offered by this configuration, whether to select one of the frequency channels belonging to the first group is determined on the basis of the result of the comparison between the threshold and the reception power of the reference signal received via the corresponding frequency channel.

In addition, in a case where the reception power of the reference signal received via one of the frequency channels belonging to the first group is high with respect to the threshold in the first aspect, the control unit may select the corresponding frequency channel. In a case where the reception power of the reference signal received via one of the frequency channels belonging to the first group is high with respect to the threshold, the corresponding frequency channel is selected according to an effect offered by this configuration.

In addition, in a case where the reception power of all of a plurality of the reference signals received via all the frequency channels belonging to the first group is low with respect to the threshold in the first aspect, the control unit may select one of the frequency channels for the data transmission from the second group. In a case where the reception power of all the plurality of reference signals received via all the frequency channels belonging to the first group is low with respect to the threshold, one of the frequency channels for the data transmission is selected from the second group according to an effect offered by this configuration.

In addition, in the first aspect, the control unit may retain information about a third group constituting the plurality of groups in a case where the information about the third group is contained in the reference signal, and select one of the frequency channels for the data transmission from the third group in a case where the reception power of all the plurality of reference signals is low with respect to the threshold in a state that the information about the third group is retained. According to an effect offered by this configuration, one of the frequency channels for data transmission is selected from the third group in a case where the reception power of all the plurality of reference signals is low with respect to the threshold in a state that the information about the third group is retained.

In addition, in the first aspect, the control unit may select one of the frequency channels for the data transmission from the third group in a case where the reception power of all the plurality of reference signals is low with respect to the threshold in a state that the information about the third group is retained, and that the information meets a fixed condition. The control unit may select one of the frequency channels for the data transmission from the second group in a case where the reception power of all the plurality of reference signals is low with respect to the threshold in a state that the information about the third group is retained, and that the information does not meet the fixed condition. According to an effect offered by this configuration, one of the frequency channels for the data transmission is selected from the third group in a case where the reception power of all the plurality of reference signals is low with respect to the threshold in a state that the information about the third group is retained, and that the information meets the fixed condition. One of the frequency channels for the data transmission is selected from the second group in a case where the reception power of all the plurality of reference signals is low with respect to the threshold in a state that the information about the third group is retained, and that the information does not meet the fixed condition.

In addition, in the first aspect, the control unit may select one of the frequency channels for the data transmission from the third group in a case where the reception power of all the plurality of reference signals is low with respect to the threshold in a state that the retained information about the third group is information within a term of validity. The control unit may select one of the frequency channels for the data transmission from the second group in a case where the reception power of all the plurality of reference signals is low with respect to the threshold in a state that the retained information about the third group is after an elapse of the term of validity. According to an effect offered by this configuration, one of the frequency channels for the data transmission is selected from the third group in a case where the reception power of all the plurality of reference signals is low with respect to the threshold in a state that the retained information about the third group is information within the term of validity. One of the frequency channels for the data transmission is selected from the second group in a case where the reception power of all the plurality of reference signals is low with respect to the threshold in a state that the retained information about the third group is after the elapse of the term of validity.

In addition, in the first aspect, the control unit may retain positional information about the wireless communication device or about the different device, and select one of the frequency channels for the data transmission from the third group in a case where the reception power of all the plurality of reference signals received via all the frequency channels belonging to the first group is low with respect to the threshold in a state that the positional information is retained, and that the positional information meets a fixed condition. The control unit may select one of the frequency channels for the data transmission from the second group in a case where the reception power of all the plurality of reference signals received via all the frequency channels belonging to the first group is low with respect to the threshold in a state that the positional information is retained, and that the positional information does not meet the fixed condition. According to an effect offered by this configuration, one of the frequency channels for the data transmission is selected from the third group in a case where the reception power of all the plurality of reference signals received via all the frequency channels belonging to the first group is low with respect to the threshold in a state that the positional information is retained, and that the positional information meets the fixed condition. One of the frequency channels for the data transmission is selected from the second group in a case where the reception power of all the plurality of reference signals received via all the frequency channels belonging to the first group is low with respect to the threshold in a state that the positional information is retained, and that the positional information does not meet the fixed condition.

In addition, in the first aspect, the control unit may select one of the frequency channels for the data transmission from the third group in a case where the reception power of all the plurality of reference signals is low with respect to the threshold in a state that the retained positional information is information within a term of validity. The control unit may select one of the frequency channels for the data transmission from the second group in a case where the reception power of all the plurality of reference signals is low with respect to the threshold in a state that the retained positional information is information after an elapse of the term of validity. According to an effect offered by this configuration, one of the frequency channels for the data transmission is selected from the third group in a case where the reception power of all the plurality of reference signals is low with respect to the threshold in a state that the retained positional information is information within the term of validity. One of the frequency channels for the data transmission is selected from the second group in a case where the reception power of all the plurality of reference signals is low with respect to the threshold in a state that the retained positional information is information after the elapse of the term of validity.

In addition, in the first aspect, the control unit may acquire new positional information in a case where the reception power of all the plurality of reference signals is low with respect to the threshold in a state that the retained positional information is information after an elapse of the term of validity, and select one of the frequency channels for the data transmission from the second group or the third group on the basis of a result of comparison between the positional information after the elapse of the term of validity and the new positional information. According to an effect offered by this configuration, new positional information is acquired in a case where the reception power of all the plurality of reference signals is low with respect to the threshold in a state that the retained positional information is information after the elapse of the term of validity. One of the frequency channels for the data transmission is selected from the second group or the third group on the basis of a result of comparison between the positional information after the elapse of the term of validity and the new positional information.

In addition, in the first aspect, the control unit may select the frequency channel used for last data transmission in a case where a position of the wireless communication device has shifted within a range defined on the basis of a threshold. According to an effect offered by this configuration, the frequency channel used for last data transmission is selected in a case where the position of the wireless communication device has shifted within the range defined on the basis of the threshold.

In addition, in the first aspect, the control unit may determine, on the basis of a battery residual quantity, whether to detect the reference signal via one of the frequency channels belonging to the first group. According to an effect offered by this configuration, whether to detect the reference signal via one of the frequency channels belonging to the first group is determined on the basis of the battery residual quantity.

In addition, in the first aspect, the control unit may select one of the frequency channels for the data transmission from the second group without detecting the reference signal via the frequency channel belonging to the first group in a case where the battery residual quantity is small with respect to a threshold. According to an effect offered by this configuration, one of the frequency channels for the data transmission is selected from the second group without detection of the reference signal via the frequency channel belonging to the first group in a case where the battery residual quantity is small with respect to the threshold.

In addition, in the first aspect, a range of bidirectional communication between the different device and the wireless communication device, and a range of only unidirectional communication between the different device and the wireless communication device may be overlaid with each other. According to an effect offered by this configuration, the range of bidirectional communication and the range of only unidirectional communication are overlaid with each other.

In addition, in the first aspect, reception sensitivity of the wireless communication device may be lower than reception sensitivity of the different device. According to an effect offered by this configuration, communication is performed in a state that reception sensitivity of the wireless communication device is lower than reception sensitivity of the different device.

In addition, a second aspect of the present technology is directed to a wireless communication device, an information processing method of this device, and a program under which a computer executes this method, the device including: a first communication unit and a second communication unit each of which performs transmission and reception operations via one of frequency channels classified into a plurality of groups that includes a first group and a second group; and a control unit that allows the first communication unit to execute a transmission operation for transmitting a reference signal at a predetermined time via one of frequency channels belonging to the first group, and a reception operation performed in a time zone different from the predetermined time via the corresponding frequency channel, and allows the second communication unit to execute transmission and reception operations via one of the frequency channels belonging to the second group. According to an effect offered by this configuration, the first communication unit is allowed to execute the transmission operation for transmitting the reference signal at the predetermined time via one of the frequency channels belonging to the first group, and the reception operation performed in the time zone different from the predetermined time via the corresponding frequency channel. The second communication unit is allowed to execute the transmission and reception operations via one of the frequency channels belonging to the second group.

In addition, in the second aspect, the control unit may allow the first communication unit to transmit the reference signal in a state that the reference signal contains information about a third group constituting the plurality of groups. According to an effect offered by this configuration, information about the third group is contained in the reference signal and transmitted.

In addition, a third aspect of the present technology is directed to a communication system, an information processing method of this system, and a program under which a computer executes this method, the system including: a first wireless communication device that includes a first communication unit and a second communication unit each of which performs transmission and reception operations via one of frequency channels classified into a plurality of groups that includes a first group and a second group, and a control unit that allows the first communication unit to execute a transmission operation for transmitting a reference signal at a predetermined time via one of frequency channels belonging to the first group, and a reception operation performed in a time zone different from the predetermined time via the corresponding frequency channel, and allows the second communication unit to execute a reception operation via one of the frequency channels belonging to the second group; and a second wireless communication device that includes a communication unit that performs data transmission to the first wireless communication device via one of the frequency channels classified into the plurality of groups, and a control unit that selects one of the frequency channels for the data transmission from the first group or the second group on the basis of a result of detection of the reference signal transmitted from the first wireless communication device via one of the frequency channels belonging to the first group. According to an effect offered by this configuration, the first wireless communication device allows the first communication unit to execute the transmission operation for transmitting the reference signal at the predetermined time via one of the frequency channels belonging to the first group, and the reception operation performed in the time zone different from the predetermined time via the corresponding frequency channel. The first wireless communication device further allows the second communication unit to execute the reception operation via one of the frequency channels belonging to the second group. The second wireless communication device selects one of the frequency channels for the data transmission from the first group or the second group on the basis of the result of detection of the reference signal transmitted from the first wireless communication device via one of the frequency channels belonging to the first group.

Effects of the Invention

According to the present technology, an excellent advantage of appropriate data communication performance is offerable. Note that advantages to be offered are not limited to these advantages, but may be any of advantages described in the present disclosure.

BRIEF DESCRIPTION OF DRAWINGS

FIG. 6 is a diagram showing a classification example which classifies frequency channels usable by the communication system 10 according to the first embodiment of the present technology into two groups.

FIG. 8 is a diagram showing a classification example which classifies frequency channels usable by the communication system 10 according to a second embodiment of the present technology into three groups.

FIG. 16 is a block diagram showing an example of a general configuration of a wireless access point.

MODES FOR CARRYING OUT THE INVENTION

Modes for carrying out the present technology (hereinafter referred to as embodiments) are described hereinbelow. The description is presented in the following order.

1. First Embodiment (example of selection of frequency channel belonging to basic group or backup group on the basis of reference signal detection result)
2. Second Embodiment (example of selection of frequency channel belonging to basic group, first backup group, or second backup group on the basis of reference signal detection result)
3. Third Embodiment (example of selection of frequency channel belonging to first backup group or second backup group on the basis of positional information about wireless communication device or base station)
4. Application Examples

1. First Embodiment

[Configuration Example of Communication System]

Figure 1:
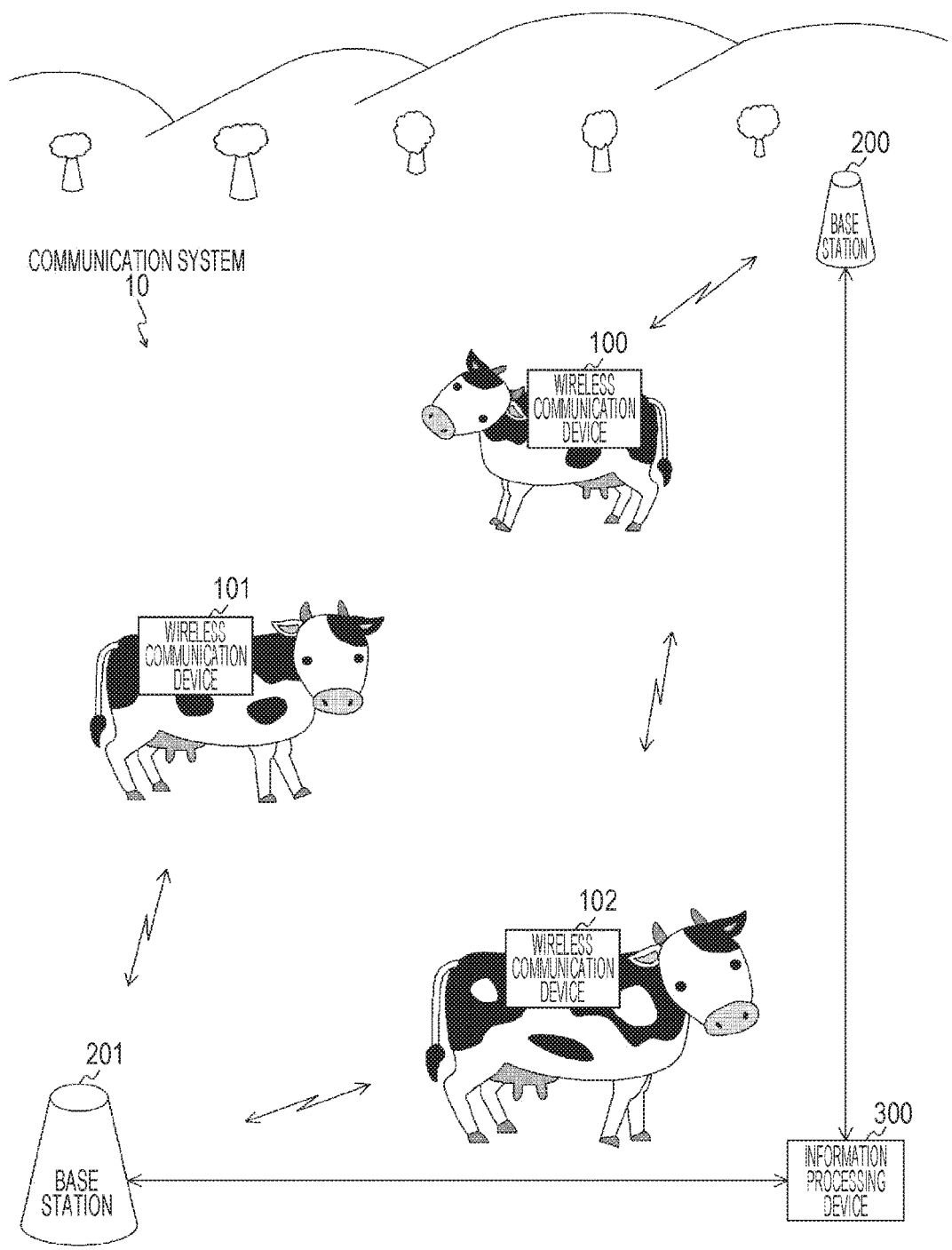
FIG. 1 is a diagram showing a system configuration example of a communication system 10 according to a first embodiment of the present technology.

FIG. 1 is a view illustrating a system configuration example of a communication system 10 according to a first embodiment of the present technology. More specifically, FIG. 1 shows a configuration example of respective devices constituting a wireless sensor network.

The communication system 10 includes wireless communication devices 100 through 102, base stations 200 and 201, and an information processing device 300. Note that the wireless communication devices 100 through 102 are examples of a wireless communication device and a second wireless communication device according to the appended claims. In addition, the base stations 200 and 201 are examples of a different device, the wireless communication device, and a first wireless communication device according to the appended claims.

FIG. 1 is a simplified depiction of an example of grazing cows to each of which the corresponding one of the wireless communication devices 100 through 102 is attached. The cows are managed on the basis of information transmitted from each of the wireless communication devices 100 through 102 attached to the corresponding cows in the manner shown in the figure.

For example, the information processing device 300 receives information acquired from the wireless communication devices 100 through 102 via the base stations 200 and 201, and manages the cows on the basis of the received information. Note that the information processing device 300 is constituted by a server, a personal computer, a tablet-type terminal, a smartphone or other information processing devices, for example.

Note that while the example shown in FIG. 1 is an example of wireless communication devices each of which is attached to one corresponding cow for convenience of description, FIG. 1 is similarly applicable to such an example which attaches a set of two or more wireless communication devices to each cow.

For example, a sensor device (potential hydrogen or power of hydrogen (pH) measuring instrument) for measuring pH may be attached to a stomach of each cow as a wireless communication device. Alternatively, for example, a sensor device (cow thermometer) capable of measuring a temperature of a cow may be attached to a cow as a wireless communication device. Information acquired by each of these sensor devices may be transmitted to an information processing device (such as server) via the base stations by utilizing wireless communication. In this case, the frequency band may be set to 920 MHz band, for example.

In addition, each of the wireless communication devices 100 through 102 may be a portable or stationary information processing device or electronic device having a wireless communication function, for example. Note that the portable information processing device (electronic device) is a smartphone, a cellular phone, or a tablet terminal, for example, and that the stationary information processing device (electronic device) is a printer or a personal computer, for example.

In addition, each of the wireless communication devices 100 through 102 may be constituted by a low power consumption type electronic device. The low power consumption type electronic device may be constituted by Bluetooth (registered trademark) Low Energy (BLE) which transmits sensor data (such as pulse, body temperature, and position), for example. In addition, the electronic device may be a device attachable to a human or an animal. For example, the electronic device may detect a sharp change of a human or an animal to which the electronic device is attached, and detect a drop of the human or the animal, heart attack or the like of the human or the animal on the basis of the change. The information thus detected is transmitted to the information processing device 300 regularly or at the time of detection via the base stations 200 and 201. For example, emergency notification (such as information associated with life of human or animal (like information for giving notice of heart attack, information for giving notice of drop)) is transmitted to the information processing device 300 at the time of detection via the base stations 200 and 201.

Note that a configuration example of the wireless communication devices 100 through 102 will be detailed with reference to FIG. 3.

Note that while FIG. 1 shows an example of the communication system 10 including the two base stations 200 and 201, the first embodiment of the present technology is applicable to a communication system including one, three or more base stations. In addition, while FIG. 1 shows the example of the communication system 10 including the three wireless communication devices 100 through 102, the first embodiment of the present technology is applicable to a communication system including one, two, four or more wireless communication devices.

In addition, the communication system 10 may recognize the wireless communication devices 100 through 102 as transmitters, and the base stations 200 and 201 as receivers. Alternatively, the communication system 10 may recognize the wireless communication devices 100 through 102 as receivers, and the base stations 200 and 201 as transmitters.

Suppose herein a communication system which includes wireless communication devices and base stations different in reception performance. More specifically, suppose a communication system which includes wireless communication devices and base stations different in reception performance of communication units of the wireless communication devices and the base stations.

It is assumed herein that the reception performance refers to performance of correct demodulation of signals corresponding to reception targets for a signal-to-noise ratio (SN). Alternatively, it is assumed herein that the reception performance refers to performance of correct demodulation of signals corresponding to reception targets for a signal-to-interference plus noise power ratio (SINR). Note that the SN or SINR is information indicating a ratio of signals corresponding to reception targets to interference signals coming from the outside and noise generated within a communication unit.

For example, reception performance may be recognized as high performance in a case where a probability of correct reception is high even at a small SN (i.e., state containing large amount of noise components). On the other hand, for example, reception performance may be recognized as low performance in a case where a probability of correct reception is low even at a large SN (i.e., state containing small amount of noise components).

For example, size reduction and long-term driving have been demanded for a wireless sensor device included in a wireless sensor network and given to a human or an object to meet conditions of limited installation spots, or reduce time and labor required for battery exchange and charge. Accordingly, reduction of power consumption is essential with the necessity of battery-powered operations performed by using a battery which has a limited capacity, for example.

For example, in case of a wireless sensor device, it is not preferable that complicated signal processing is performed by a receiver receiving signals from a base station in view of reduction of power consumption. Accordingly, the receiver receiving signals from the base station is often configured to have limited performance. It is also considered that the receiver receiving signals from the base station operates in an operation mode which reduces signal processing and lowers performance of the receiver to realize a low power consumption operation of the receiver.

On the other hand, the demand given to the base station for reduction of power consumption is not strong in comparison with the demand given to the wireless sensor device in view of stable power supply and the size of the base station. In this case, high-level signal processing may be performed by the receiver of the base station receiving signals from a wireless communication device. In addition, high reception performance is achievable on the basis of high-level signal processing.

Note herein that most of communication systems are capable of performing data communication in conformity with a variety of communication standards such as a public network, a wireless local area network (LAN), and a personal area network. Many of these communication systems are allowed to perform data communication only in a case where signals are receivable from a wireless device corresponding to a communication partner (such as base station and base unit).

Note that the public network is constituted by a network of 1st generation (1G), 2nd generation (2G), or 3rd generation (3G), for example. Alternatively, the public network is constituted by a network of long term evolution (LTE), LTE-advanced (LTE-A), or 5th generation (5G), for example. In addition, the wireless LAN is constituted by institute of electrical and electronic engineers (IEEE) 802.11, for example. In addition, the personal area network is constituted by a network of IEEE 802.15 (such as Bluetooth (registered trademark) and ZigBee (registered trademark)), for example.

A wireless LAN, for example, is configured to transmit signals to a base station (access point (AP)) on the basis of reception of beacon signals regularly transmitted from the base station via a wireless device (station (STA)). In this case, the wireless device is difficult to transmit data to the base station at a spot where beacons are difficult to receive.

Similarly, reception of reference signals transmitted from a communication partner is often a precondition for transmission of data in other types of communication systems.

Accordingly, a state that wireless devices (base station and wireless communication device) are positioned within a signal receivable range from each other is often a precondition for communication in a communication system, for example.

Figure 2:
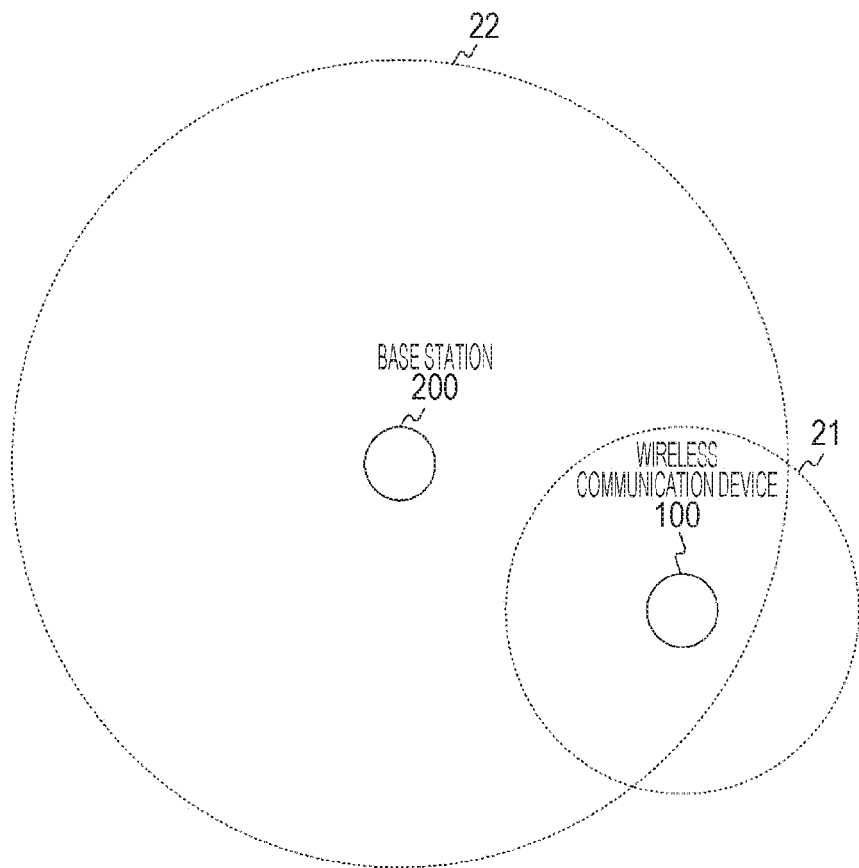
FIG. 2 is a diagram schematically showing an example of a reception performance comparison between a wireless communication device 100 and a base station 200 according to the first embodiment of the present technology.

In a case where reception performance is different for each wireless device constituting a communication system, for example, a receivable range of a wireless device having limited reception performance becomes a data transmittable range. FIG. 2 shows an example of a positional relationship between a plurality of wireless devices having limited reception performance.

[Comparative Example of Reception Performance of Wireless Communication Device and Base Station]

FIG. 2 is a view schematically illustrating an example of reception performance comparison between the wireless communication device 100 and the base station 200 according to the first embodiment of the present technology. FIG. 2 shows a comparison example of the wireless communication device 100 and the base station 200 illustrated in FIG. 1.

As described above, reception performance of the wireless communication device 100 is different from reception performance of the base station 200. It is assumed that a wide receivable range is defined for the base station 200 performing high-level signal processing, for example. On the other hand, it is assumed that a receivable range narrower than the receivable range of the base station 200 is defined for the wireless communication device 100 performing limited signal processing.

In FIG. 2, the receivable range of the wireless communication device 100 is schematically indicated by a circle 21 expressed by a dotted line. On the other hand, the receivable range of the base station 200 is schematically indicated by a circle 22 expressed by a dotted line. The dotted-line circles 21 and 22 therefore show the receivable ranges of the wireless communication device 100 and the base station 200, respectively, in accordance with reception performance.

It is assumed, as described above, that the wireless communication device 100 and the base station 200 have the positional relationship illustrated in FIG. 2. In this case, the wireless communication device 100 is contained in the receivable range of the base station 200 (dotted-line circle 22). Accordingly, the base station 200 is capable of receiving signals transmitted from the wireless communication device 100. On the other hand, the base station 200 is not contained in the receivable range of the wireless communication device 100 (dotted-line circle 21). Accordingly, the wireless communication device 100 is unable to receive signals transmitted from the base station 200.

As understood from above, the communicative range between the base station and the wireless communication device may be limited by the reception performance of the wireless communication device in the wireless sensor network. In other words, the receivable range may be narrowed by the small-sized and low power consumption wireless communication device. In this case, a larger number of base stations may be needed, and raise costs of the communication system.

For overcoming these problems, discussed in the embodiment of the present technology is an example which expands a communication range of a wireless sensor network while reducing limitation to the communication range imposed by reception performance of a wireless communication device. According to this embodiment, reduction of the number of base stations constituting the network, and therefore reduction of costs of the communication system are realizable.

[Configuration Example of Wireless Communication Device]

Figure 3:
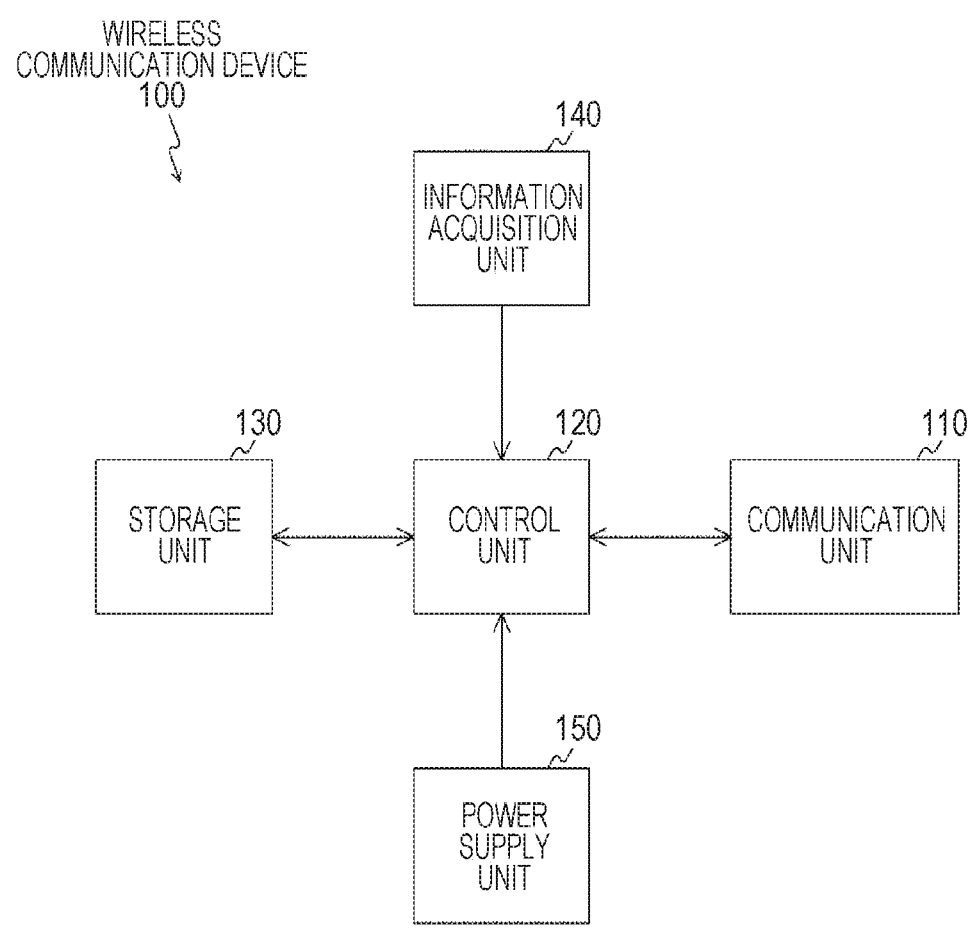
FIG. 3 is a block diagram showing a function configuration example of the wireless communication device 100 according to the first embodiment of the present technology.

FIG. 3 is a block diagram showing a functional configuration example of the wireless communication device 100 according to the first embodiment of the present technology. Note that each of function configurations of the wireless communication devices 101 and 102 (function configurations relating to wireless communication) is substantially identical to the function configuration of the wireless communication device 100. Accordingly, only the wireless communication device 100 is touched upon, while description of the other wireless communication devices is omitted.

The wireless communication device 100 includes a communication unit 110, a control unit 120, a storage unit 130, an information acquisition unit 140, and a power supply unit 150.

The communication unit 110 is a module (such as wireless LAN modem) for transmitting and receiving radio waves via an antenna (not shown). For example, the communication unit 110 performs transmission and reception processes under control by the control unit 120. For example, the communication unit 110 transmits and receives wireless signals in a predetermined frame format.

For example, the communication unit 110 may perform wireless communication by using a communication system in conformity with IEEE 802.11, IEEE 802.15, and IEEE 802.16. In addition, for example, the communication unit 110 may perform wireless communication by using a communication system in conformity with 3rd generation partnership project (3GPP) specifications. Note that examples of 3GPP specifications include wideband code division multiple access (W-CDMA), global system for mobile communications (GSM (registered trademark), worldwide Interoperability for microwave access (WiMAX), WiMAX2, LTE, and LTE-A.

In addition, for example, the communication unit 110 may perform wireless communication by using a communication system in conformity with other public networks (cellular phone networks), Bluetooth (registered trademark), ZigBee (registered trademark), BLE, and ANT (protocol of super-low power consumption type short-range network in 2.4 GHz band).

In addition, the communication unit 110 may exchange various types of information by using a wireless communication function. For example, the communication unit 110 may perform wireless communication with other devices by using a wireless LAN. This wireless LAN may be wireless fidelity (Wi-Fi) direct, tunneled direct link setup (TDLS), an ad hoc network, and a mesh network, for example.

The control unit 120 is configured to control respective units of the wireless communication device 100 under control programs stored in the storage unit 130. The control unit 120 is realized by a central processing unit (CPU). In addition, for example, the control unit 120 performs signal processing for information transmitted or received. For example, the control unit 120 generates transmission frames, or makes determinations based on received information. In addition, for example, the control unit 120 may measure and use reception power of received signals. Note that reception power is information indicating intensity of received signals, and also is recognizable as a reception signal intensity level.

In addition, for example, the control unit 120 may change parameters to change frequency channels for transmission and reception performed by the communication unit 110. In this case, the communication unit 110 is allowed to transmit data to other devices (such as base stations 200 and 201) by using frequency channels classified into a plurality of groups including a basic group and a backup group shown in FIG. 6.

In addition, for example, the control unit 120 detects reference signals transmitted from other devices (such as base stations 200 and 201) via a frequency channel belonging to the basic group. In this case, the control unit 120 selects a frequency channel for data transmission to other devices (such as base stations 200 and 201) from the basic group or the backup group on the basis of a detection result.

The storage unit 130 is a memory for storing various types of information. For example, the storage unit 130 stores various types of information necessary for performing desired operations by the wireless communication device 100 (such as control programs).

The information acquisition unit 140 functions as an acquisition unit (such as sensor) for acquiring various types of information, and outputs acquired information to the control unit 120. In addition, the control unit 120 transmits information acquired by the information acquisition unit 140 to other devices by utilizing wireless communication. The information acquisition unit 140 is realized by a pH meter, a cow thermometer, or a positional information acquisition device (such as GPS module), for example.

The power supply unit 150 is configured to supply power to respective units of the wireless communication device 100 under control by the control unit 120. For example, the power supply unit 150 is constituted by a battery contained in the wireless communication device 100, or a battery attachable to the wireless communication device 100. In addition, the control unit 120 has a function for estimating a battery residual quantity to acquire an estimated battery residual quantity as necessary.

[Configuration Example of Base Station]

Figure 4:
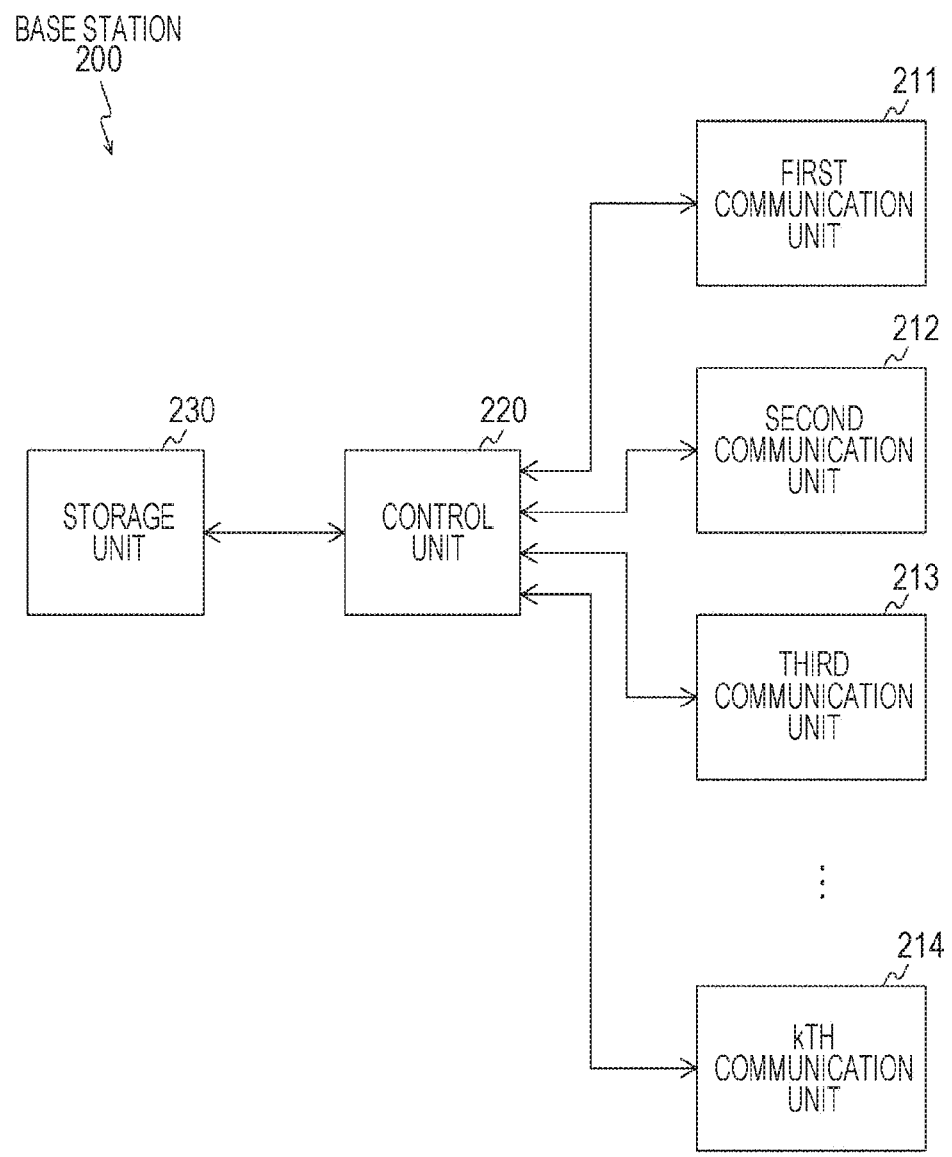
FIG. 4 is a block diagram showing a function configuration example of the base station 200 according to the first embodiment of the present technology.

FIG. 4 is a block diagram showing a function configuration example of the base station 200 according to the first embodiment of the present technology. Note that the function configuration of the base station 201 (function configuration relating to wireless communication) is substantially identical to the base station 200. Accordingly, only the base station 200 is touched upon, while description of the base station 201 is omitted.

The base station 200 includes a first communication unit 211, a second communication unit 212, a third communication unit 213, a kth communication unit 214, a control unit 220, and a storage unit 230.

Each of the first communication unit 211, the second communication unit 212, the third communication unit 213, and the kth communication unit 214 is a module for transmitting and receiving radio waves (such as wireless LAN modem) via an antenna (not shown). For example, each of the first communication unit 211, the second communication unit 212, the third communication unit 213, and the kth communication unit 214 performs transmission and reception processes under control by the control unit 220. For example, each of the first communication unit 211, the second communication unit 212, the third communication unit 213, and the kth communication unit 214 transmits and receives wireless signals in a predetermined frame format.

Note that, while only the four communication units (first communication unit 211, the second communication unit 212, the third communication unit 213, and the kth communication unit 214) are shown in FIG. 4, the base station 200 may include the k (such as 2, 3, 5, or larger) communication units.

In addition, it is assumed that the respective communication units (first communication unit 211, the second communication unit 212, the third communication unit 213, and the kth communication unit 214) are configured to perform transmission and reception via a plurality of frequency channels. More specifically, the respective communication units (first communication unit 211, the second communication unit 212, the third communication unit 213, and the kth communication unit 214) are configured to simultaneously perform transmission and reception via different frequency channels.

In addition, the respective communication units (first communication unit 211, the second communication unit 212, the third communication unit 213, and the kth communication unit 214) may perform wireless communication by a communication system corresponding to the communication unit 110 shown in FIG. 3. For example, each of the communication units may perform wireless communication by a communication system in conformity with IEEE 802.11, IEEE 802.15, IEEE 802.16, and 3GPP.

In addition, for example, each of the communication units may perform wireless communication by using a communication system in conformity with another public network (cellular phone network), Bluetooth (registered trademark), ZigBee (registered trademark), BLE, and ANT (protocol of super-low power consumption type short-range network in 2.4 GHz band).

In addition, each of the communication units may exchange various types of information by using a wireless communication function. For example, the communication unit 110 may perform wireless communication with other devices by using a wireless LAN. The wireless LAN may be Wi-Fi Direct, TDLS, an ad hoc network, and a mesh network, for example.

The control unit 220 is configured to control respective units of the base station 200 under control programs stored in the storage unit 230. The control unit 220 is realized by a CPU, for example. In addition, for example, the control unit 220 performs signal processing for information transmitted or received. For example, the control unit 220 generates transmission frames, or makes determinations based on received information. In addition, for example, the control unit 220 may measure and use reception power of received signals.

In addition, for example, the control unit 220 may change parameters to switch frequency channels used for transmission and reception by the respective communication units (first communication unit 211, the second communication unit 212, the third communication unit 213, and the kth communication unit 214). In this case, the respective communication units are allowed to perform transmission and reception operations via frequency channels classified into a plurality of groups including the basic group and the backup group shown in FIG. 6.

In addition, for example, the control unit 220 allows at least one of the communication units to execute a transmission operation for transmitting a reference signal at a predetermined time via a frequency channel belonging to the basic group, and a reception operation in a time band other than the predetermined time via the identical frequency channel. Note that the predetermined time is either a regular time, or an irregular time (issue of transmission request for reference signal). In addition, for example, the control unit 220 allows a different one of the communication units to execute the transmission and reception operations via a frequency channel belonging to a backup group.

The storage unit 230 is a memory for storing various types of information. For example, the storage unit 230 stores various types of information necessary for performing desired operations by the base station 200 (such as control programs).

[Configuration Example of Frame Format]

Figure 5:
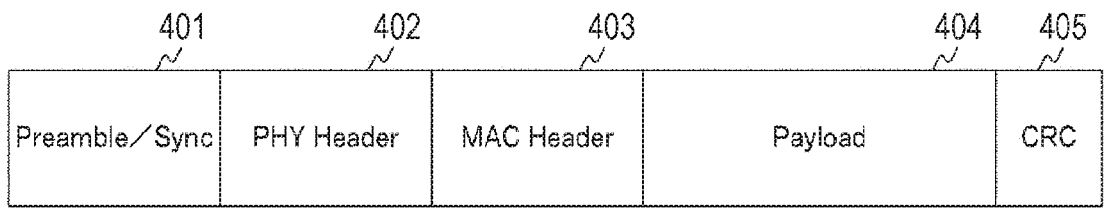
FIG. 5 is a diagram showing a configuration example of a frame format of a signal transmitted from each of the wireless communication devices 100 through 102 and the base stations 200 and 201 according to the first embodiment of the present technology.

FIG. 5 is a diagram showing a configuration example of a frame format of signals transmitted from the wireless communication devices 100 through 102 and the base stations 200 and 201 according to the first embodiment of the present technology. FIG. 5 shows a configuration example of a data frame in a case where the communication system is a wireless LAN.

For example, the frame format is constituted by a preamble/sync 401, a physical layer (PHY) header 402, a media access control (MAC) header 403, a payload 404, and a cyclic redundancy check (CRC) 405.

The preamble/sync 401 is a fixed pattern determined beforehand. In addition, the preamble/sync 401 is used for detection of signals and synchronization of frames in a receiver. For example, the preamble/sync 401 is a known pattern used by the receiver for detecting wireless signals. For example, the receiver may detect the presence or absence of wireless signals by calculating correlation between the known pattern and received signals.

The PHY header 402 is a section for storing information relating to a physical frame. The information relating to a physical frame indicates information such as a length of a part after the PHY header 402 (MAC header 403, payload 404, and CRC 405), and a modulation system. In this case, the receiver may receive the part after the PHY header 402 on the basis of information stored in the PHY header 402.

The MAC header 403 is a part for storing address information indicating each address of a transmitter and the receiver. The address information corresponds to a unique ID of the corresponding device (such as terminal ID), and may be identical to a MAC address. Alternatively, other terminal identification information may be adopted. In addition, the MAC header 403 stores types of information to be stored in the payload 404, for example.

The payload 404 is transmission data. In a case where the transmitter is a sensor device, for example, information acquired by the sensor device (sensor information) is stored in the payload 404.

The CRC 405 stores information for detecting frame errors. The receiver may detect frame errors on the basis of the information stored in the CRC 405.

It is assumed herein that each of the base stations 200 and 201 cyclically transmits reference signals (such as beacons). The reference signals may have the frame format shown in FIG. 5, for example. In this case, only the preamble/sync 401 included in the frame format shown in FIG. 5 may be transmitted as the reference signals, or other information may be transmitted as the reference signals.

[Transmission Example of Reference Signal]

Transmission of reference signals from the base station 200 is hereinafter described.

For example, each of the base stations 200 and 201 cyclically transmits reference signals via a predetermined frequency channel (such as f1) by using one of the plurality of communication units (first communication unit 211, second communication unit 212, third communication unit 213, and kth communication unit 214). For example, the control unit 220 of the base station 200 may cyclically transmit reference signals via a predetermined frequency channel (such as f1) by using the first communication unit 211.

The reference signals to be transmitted may have the frame format shown in FIG. 5, for example. Note that the reference signals are transmitted for the purpose of detection of the presence or absence of signals. Accordingly, only the preamble/sync 401 included in the frame format shown in FIG. 5 may be transmitted as the reference signals, or other information may be transmitted as the reference signals.

In addition, it is assumed herein, for example, that the base station 200 cyclically transmits reference signals via a predetermined frequency channel (f1) by using the first communication unit 211. In this case, the first communication unit 211 performs a reception operation via the frequency channel (such as f1) while not transmitting reference signals. On the other hand, the communication units (second communication unit 212, third communication unit 213, and kth communication unit 214) other than the first communication unit 211 of the base station 200 perform a reception operation via a frequency channel different from the frequency channel used by the first communication unit 211.

According to the first embodiment of the present technology, therefore, the frequency channels usable by the communication system 10 are classified into two groups. FIG. 6 shows an example of the respective groups.

[Group Classification Example of Frequency Channels]

FIG. 6 is a view showing a classification example which classifies frequency channels usable by the communication system 10 into two groups according to the first embodiment of the present technology.

FIG. 6 shows an example in a case where n (n: positive integer) frequency channels are usable by the communication system 10. In addition, the example shown in the figure is a classification example which classifies the frequency channels usable by the communication system 10 into a basic group (frequency channel group) and a backup group (frequency channel group). The basic group herein is a frequency channel group used for measurement of reference signals and data transmission in a normal condition, for example. On the other hand, the backup group is a frequency channel group used in a case where data transmission via a frequency channel belonging to the basic group is difficult to perform, for example. Note that the basic group is an example of a first group according to the appended claims. On the other hand, the backup group is an example of a second group according to the appended claims.

It is assumed, for example, that m frequency channels belong to the basic group inn frequency channels usable by the communication system 10 ($0<m<n$ (m; integer)). In FIG. 6, the frequency channels belonging to the basic group are indicated as f1, f2 and up to fm.

On the other hand, it is assumed, for example, that (n−m) frequency channels belong to the backup group in the n frequency channels usable by the communication system 10. In FIG. 6, the frequency channels belonging to the backup group are indicated as fm+1, fm+2, and up to ft.

In this case, a simple numerical value is set to the number of the frequency channels belonging to the basic group or the backup group for simplifying the description. For example, both of the numbers of the frequency channels belonging to the basic group and the backup group may be set to 15 in a case where n=30. Alternatively, the numbers of the frequency channels belonging to the basic group and the backup group may be set to 10 and 20, respectively, in a case where n=30. In addition, the plurality of frequency channels may be classified into the basic group and the backup group under various rules.

Note that it is assumed that the number n of the frequency channels usable by the communication system 10 is larger than the number k of the communication units included in the base station 200.

For example, one of the frequency channels is selected from the basic group as a frequency channel used by the first communication unit 211 of the base station 200. In this case, one of the different frequency channels (frequency channels different from frequency channel used by first communication unit 211 of base station 200) is selected from the basic group for a different base station located adjacent to or close to the base station 200.

On the other hand, for example, a frequency channel used by the other communication units of the base station 200 (second communication unit 212, third communication unit 213, and kth communication unit 214) is selected from the backup group. In this case, a frequency channel used by the other communication units (second communication unit 212, third communication unit 213, and kth communication unit 214) of the different base station located adjacent to or close to the base station 200 is similarly selected from the backup group.

Incidentally, for example, frequency channels belonging to the basic group and used by a base station may be set by a common carrier at the time of installation of the base station. In addition, for example, frequency channels may be switched by changing parameters.

In addition, frequency channels usable by a wireless communication device are classified into the basic group and the backup group. This classification is set at the time of shipment of the wireless communication device, for example. In addition, after shipment of the wireless communication device, classification into the basic group and the backup group may be changed manually or via a network.

[Operation Example of Wireless Communication device]

Figure 7:
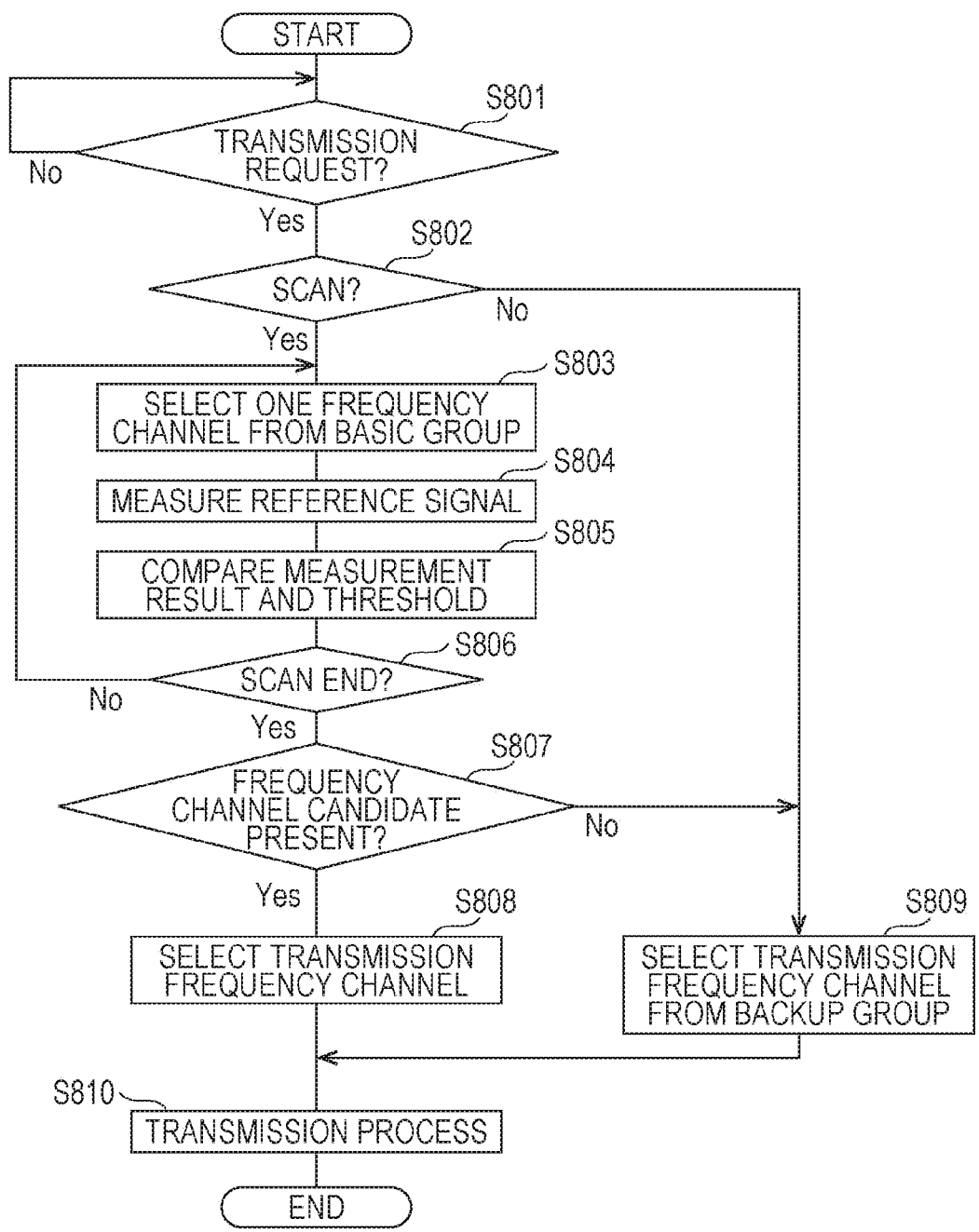
FIG. 7 is a flowchart showing an example of processing procedures of a transmission process performed by the wireless communication device 100 according to the first embodiment of the present technology.

FIG. 7 is a flowchart showing an example of processing procedures of a transmission process performed by the wireless communication device 100 according to the first embodiment of the present technology. Note that operation examples performed by the wireless communication devices 101 and 102 are identical to the operation example of the wireless communication device 100. Accordingly, only the operation of the wireless communication device 100 is touched upon, while description of the operation of the wireless communication devices 101 and 102 is omitted.

Initially, the control unit 120 of the wireless communication device 100 determines whether or not a transmission request to the base station has been issued (step S801). It is assumed, for example, that in a case where new information (such as sensor information) is acquired by the information acquisition unit 140, or in a case where a definite change (such as change equivalent to threshold or more) is produced in information acquired by the information acquisition unit 140, the wireless communication device 100 transmits the information to the base station. According to this example, it is assumed that a transmission request is issued on an occasion of acquisition of sensor information or a change of sensor information. In addition, in a case where no transmission request is issued to the base station (step S801), monitoring continues.

In a case where a transmission request is issued to the base station (step S801), the control unit 120 determines whether to execute a scan operation (step S802). Execution of the scan operation consumes a certain amount of power. It is therefore preferable that the scan operation is not performed in a case where a small battery quantity is left. Accordingly, the control unit 120 may determine whether to execute the scan operation on the basis of the battery residual quantity of the wireless communication device 100 (step S802). For example, in a case where the battery residual quantity of the wireless communication device 100 is larger than a threshold, the control unit 120 determines to execute the scan operation (step S802). On the other hand, in a case where the battery residual quantity of the wireless communication device 100 is smaller than the threshold, the control unit 120 determines not to execute the scan operation (step S802). It may therefore be determined whether to execute the scan operation in consideration of the battery residual amount of the wireless communication device 100.

In a case where execution of the scan operation (step S802) is determined, the control unit 120 selects one frequency channel (target frequency channel) from a plurality of frequency channels belonging to the basic group (step S803). One of the plurality of frequency channels belonging to the basic group is thus selected and used as the target frequency channel for scan operation at the time of execution of the scan operation.

Subsequently, while using the selected target frequency channel, the control unit 120 measures reception power of reference signals cyclically transmitted from the base station (step S804). For example, reception power may be acquired on the basis of a correlating value of a preamble/sync part constituting a fixed pattern. For example, a degree of agreement between correlating values of respective preamble/sync parts may be regarded as a level of reception power.

Subsequently, the control unit 120 compares a measurement result (measured reception power) with a threshold set beforehand, and detects a frequency channel which indicates reception power exceeding the threshold (step S805). This threshold may be set in accordance with a reception ability of the wireless communication device 100. For example, the threshold may be set in accordance with SN. Thereafter, the control unit 120 determines the target frequency channel whose reception power exceeds the threshold as a transmission frequency channel candidate (step S805). Note that steps S803 through S805 are an example of a first procedure according to the appended claims.

Subsequently, the control unit 120 determines whether or not the scan operation has ended (step S806). More specifically, the control unit 120 determines whether or not a frequency channel not used for the scan operation is present in the plurality of frequency channels belonging to the basic group (step S806). Then, in a case where a frequency channel not used for the scan operation is present (step S806), the flow returns to step S803 to execute the scan operation by using this frequency channel. In other words, the scan operation continues.

On the other hand, in a case where the scan operation is executed by using all the frequency channels belonging to the basic group (step S806), the scan operation ends. More specifically, in a case where no frequency channel not used for the scan operation is present in the plurality of frequency channels belonging to the basic group, the scan operation ends (step S806).

In addition, in a case where a frequency channel which indicates reception power exceeding the threshold is detected on the basis of the comparison between the measurement result (measured reception power) and the threshold set beforehand (step S805), the scan operation may be finished at the time of this detection. More specifically, in a case where a frequency channel which indicates reception power exceeding the threshold is detected (step S805), the scan operation may be ended before completion of the scan operation for all the frequency channels belonging to the basic group.

In a case where the scan operation ends (step S806), the control unit 120 selects a frequency channel used for transmission (transmission frequency channel) on the basis of a result of the scan operation (steps S807, S808). More specifically, the control unit 120 selects, as a transmission frequency channel, the frequency channel indicating the maximum reception power from the plurality of frequency channels detected as transmission frequency channel candidates in the scan operation (step S808). Note that, in a case where only one frequency channel is selected as a transmission frequency channel candidate, this frequency channel is selected as a transmission frequency channel (step S808). Note that the frequency channel selected herein is a frequency channel used for the scan operation, and a channel belonging to the basic group.

On the other hand, the flow proceeds to step S809 in a case where no transmission frequency channel candidate is detected in the scan operation (step S807).

Subsequently, the control unit 120 performs a transmission process for transmitting data to the base station via the frequency channel selected as a transmission frequency channel (step S810).

On the other hand, the control unit 120 selects a transmission frequency channel from frequency channels belonging to the backup group (step S809) in a case where it is determined not to execute the scan operation (step S802). In this case, in a case where a plurality of frequency channels belong to the backup group, the control unit 120 may select any one of the frequency channels. For example, the control unit 120 may sequentially select a frequency channel for each data transmission. Alternatively, for example, the control unit 120 may randomly select a frequency channel for each data transmission.

The scan operation performed herein repeats the respective processes for all the frequency channels belonging to the basic group, and therefore increases processing loads in accordance with an increase in the number of the frequency channels belonging to the basic group. On the other hand, the data transmission which uses the frequency channels belonging to the backup group may increase interference, but reduce processing loads in comparison with the processes repeated for all the frequency channels belonging to the basic group. Accordingly, in a case where it is determined not to execute the scan operation (step S802), a transmission frequency channel is selected from the frequency channels belonging to the backup group (step S809). Note that steps S807 through S809 are an example of a second procedure according to the appended claims.

In addition, in a case where a plurality of frequency channels belong to the backup group, the control unit 120 may select a plurality of any frequency channels. In this case, the control unit 120 uses any one of the plurality of selected frequency channels for each data transmission, for example.

As described above, the control unit 120 may determine whether to select a frequency channel on the basis of a comparison result between a threshold and reception power of reference signals received via the corresponding frequency channel belonging to the basic group. In this case, the control unit 120 selects a frequency channel used for reception of reference signals indicating high reception power with respect to a threshold.

On the other hand, in a case where the reception power of all the plurality of reference signals received via all the frequency channels belonging to the basic group is low with respect to the threshold, the control unit 120 selects a frequency channel for data transmission from the backup group.

In addition, the control unit 120 may refer to a battery residual quantity of the wireless communication device 100 to determine whether to detect reference signals via the frequency channels belonging to the basic group. In this case, the control unit 120 may select a frequency channel for data transmission from the backup group without executing detection of reference signals via the frequency channels belonging to the basic group in a case where the battery residual quantity is small with respect to a threshold.

As described above, the communication range of the wireless sensor network expands without limitation to the communication range imposed by the reception performance of the wireless communication device. According to this embodiment, reduction of the number of base stations constituting the network, and therefore reduction of costs of the communication system are realizable.

2. Second Embodiment

According to the example presented in the first embodiment of the present technology, a frequency channel is selected from the basic group or the backup group on the basis of a detection result of reference signals. Discussed in the second embodiment of the present technology is an example which selects a frequency channel from a basic group, a first backup group, or a second backup group on the basis of a detection result of reference signals.

Note that configurations of respective devices according to the second embodiment of the present technology are substantially identical to the corresponding configurations of the wireless communication devices 100 through 102 and the base stations 200 and 201 shown in FIG. 1 and other figures. Accordingly, parts common to the corresponding parts of the first embodiment of the present technology are given reference numbers identical to the corresponding reference numbers of the first embodiment of the present technology. A part of description about these parts is omitted.

[Group Classification Example of Frequency Channels]

FIG. 8 is a view showing a classification example which classifies frequency channels usable by the communication system 10 into three groups according to the second embodiment of the present technology.

FIG. 8 shows an example in a case where n (n: positive integer) frequency channels are usable by the communication system 10. In addition, the example shown in the figure is a classification example which classifies the frequency channels usable by the communication system 10 into a basic group (frequency channel group), a first backup group (frequency channel group), and a second backup group (frequency channel group). The basic group and the second backup group herein correspond to the basic group and the backup group shown in FIG. 6, respectively. On the other hand, the first backup group is a frequency channel group used in a case where data transmission by using a frequency channel belonging to the basic group is difficult to perform. Note that the second backup group is an example of a second group according to the appended claims. On the other hand, the first backup group is an example of a third group according to the appended claims.

It is assumed, for example, that m1 frequency channels (0<m1<n (m1: integer)) belong to the basic group in then frequency channels usable by the communication system 10. In FIG. 8, the frequency channels belonging to the basic group are indicated as f1, f2 and up to fm1.

On the other hand, it is assumed, for example, that the (m2-m1) frequency channels (0<m1<m2<n (m1, m2: integer)) belong to the first backup group in the n frequency channels usable by the communication system 10. In FIG. 8, the frequency channels belonging to the first backup group are indicated as fm1+1, fm1+2, and up to fm2.

Furthermore, it is assumed, for example, that the (n−m2) frequency channels (0<m2<n (m2: integer)) belong to the second backup group in the n frequency channels usable by the communication system 10. In FIG. 8, the frequency channels belonging to the second backup group are indicated as fm2+1, fm2+2, and up to ft.

For example, one of the frequency channels is selected from the basic group as a frequency channel used by the first communication unit 211 of the base station 200. In this case, one of the different frequency channels (frequency channels different from frequency channel used by first communication unit 211 of base station 200) is selected from the basic group for a different base station located adjacent to or close to the base station 200.

On the other hand, for example, a frequency channel used by the other communication units of the base station 200 (second communication unit 212, third communication unit 213, and kth communication unit 214) is selected from the first backup group or the second backup group. For example, a frequency channel used by the second communication unit 212 and the third communication unit 213 is selected from the second backup group, while a frequency channel used by the kth communication unit 214 is selected from the first backup group. In addition, similarly, a frequency channel used by the other communication units (second communication unit 212, third communication unit 213, and kth communication unit 214) of the different base station located adjacent to or close to the base station 200 is selected from the first backup group or the second backup group.

[Transmission Example of Reference Signal]

Reference signals (such as beacons) transmitted by the base station 200 are hereinafter described. According to the second embodiment of the present technology, information for specifying frequency channels belonging to the first backup group (frequency channel information) is stored in the payload 404 in a case where the frame format shown in FIG. 5 is adopted for reference signals. In this case, the wireless communication device having received a reference signal is capable of recognizing a frequency channel belonging to the first backup group on the basis of frequency channel information stored in the payload 404 of the received reference signal. Note that the frequency channel information is stored in any area of a reference signal in a case where the reference signal has a format other than the frame format shown in FIG. 5.

Accordingly, the control unit 220 of the base station 200 is capable of transmitting a reference signal containing information relating to the first backup group (frequency channel information) to at least one communication unit.

[Distribution Example of Receivable Range of Respective Groups Associated with Wireless Communication Device]

Figure 9:
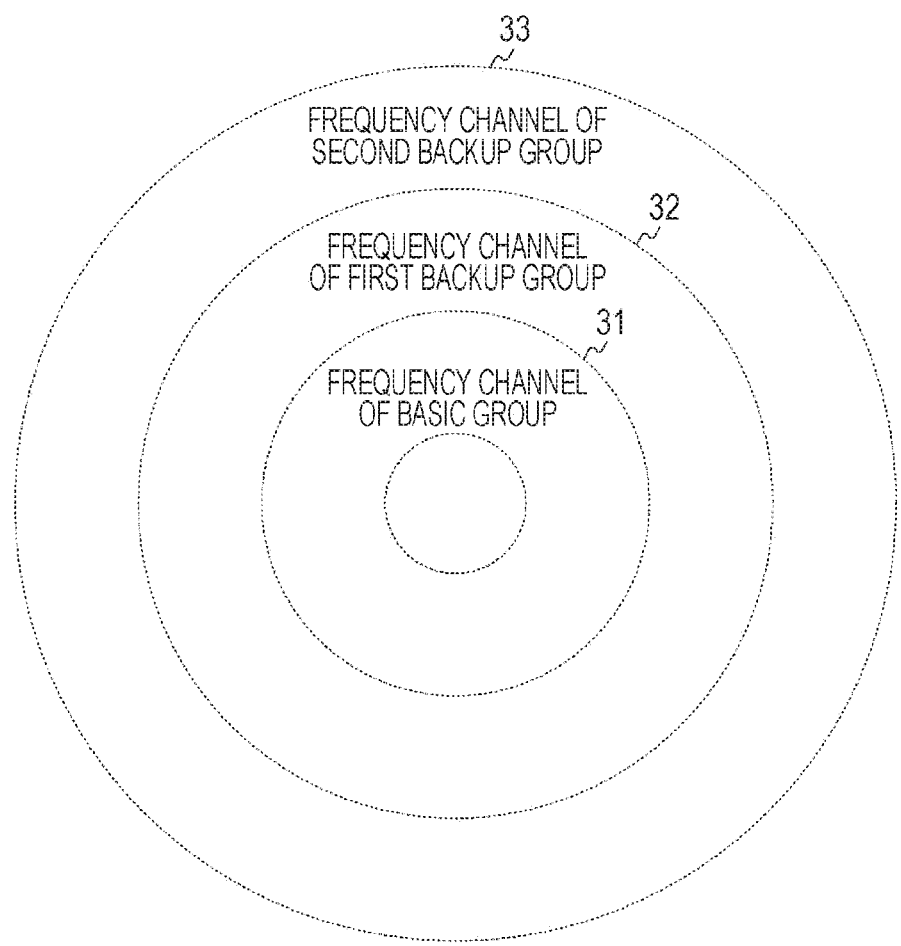
FIG. 9 is a diagram schematically showing a distribution example of receivable ranges of the respective groups associated with the wireless communication device 100 according to the second embodiment of the present technology.

FIG. 9 is a diagram schematically showing a distribution example of receivable ranges of the respective groups associated with the wireless communication device 100 according to the second embodiment of the present technology. Note that FIG. 9 is a schematic diagram of the distribution example of the receivable ranges of the respective groups, and does not define receivable ranges of the respective groups.

FIG. 9 schematically shows a dotted-line circle 31 indicating a signal receivable range of a frequency channel belonging to the basic group. In addition, a dotted-line circle 32 (located outside dotted-line circle 31) schematically shows a signal receivable range of a frequency channel belonging to the first backup group. In addition, a dotted-line circle 33 (located outside dotted-line circle 32) schematically shows a signal receivable range of a frequency channel belonging to the second backup group.

[Operation Example of Wireless Communication Device]

Figure 10:
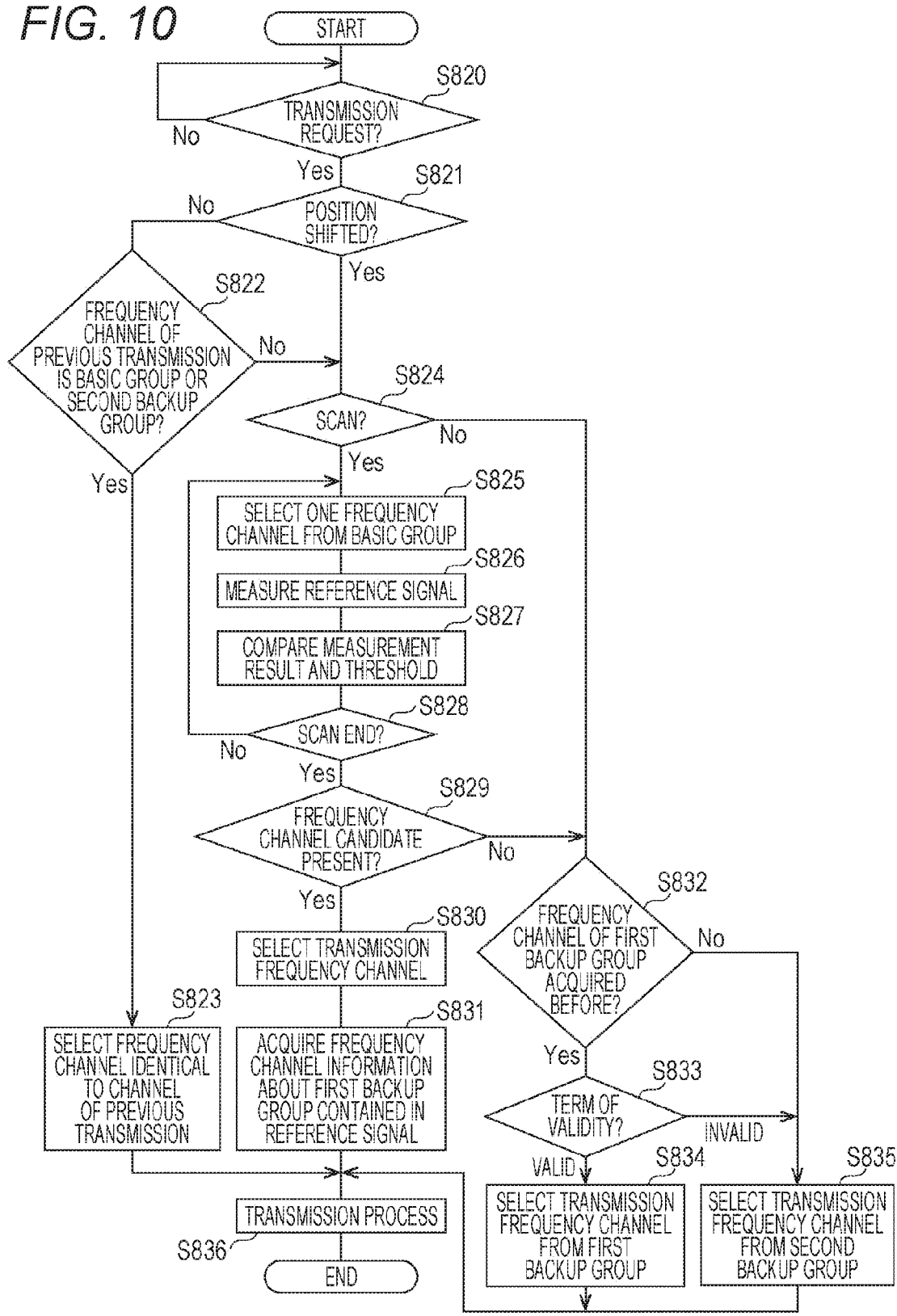
FIG. 10 is a flowchart showing an example of processing procedures of a transmission process performed by the wireless communication device 100 according to the second embodiment of the present technology.

FIG. 10 is a flowchart showing an example of processing procedures of a transmission process performed by the wireless communication device 100 according to the second embodiment of the present technology. Note that operation example shown in FIG. 10 is a modified example of the example shown in FIG. 7. Accordingly, a part of description of processing procedures common to the corresponding procedures in FIG. 7 is omitted.

Processing procedures shown in FIG. 10 (steps S820, S824 through S830, S835, S836) correspond to the processing procedures shown in FIG. 7 (steps S801 through S810).

In a case where a transmission request is issued to the base station (step S820), the control unit 120 determines whether or not the position of the wireless communication device 100 has changed (step S821). For example, in a case where the information acquisition unit 140 is a sensor device capable of acquiring positional information (such as GPS device), the control unit 120 may determine whether or not the wireless communication device 100 has shifted by an amount other than a fixed amount on the basis of the positional information acquired by the information acquisition unit 140. Thereafter, it is determined that the position of the wireless communication device 100 has changed in a case where the wireless communication device 100 shifts by an amount other than the fixed amount.

In addition, in a case where it is determined that the position of the wireless communication device 100 has changed (step S821), the flow proceeds to step S824. In a case where it is determined that the position of the wireless communication device 100 does not change (step S821), the control unit 120 determines whether or not the frequency channel used for previous data transmission belongs to the basic group or the second backup group (step S822). Then, in a case where the frequency channel used for previous data transmission belongs to the basic group or the second backup group (step S822), the control unit 120 selects the frequency channel identical to the frequency channel used for previous data transmission (step S823). More specifically, in a case where the position of the wireless communication device 100 does not change in a state that the frequency channel belonging to the basic group or the second backup group has been used for previous data transmission (steps S821, S822), the flow proceeds to step S823. In this case, the frequency channel used for previous data transmission corresponds to the latest frequency channel used for successful data transmission. Subsequently, the frequency channel belonging to the basic group or the second backup group and corresponding to the latest frequency channel used for successful data transmission is selected (step S823). Note that a term of validity is set for each of the frequency channels belonging to the first backup group in this example. Accordingly, the frequency channel identical to the frequency channel used for previous data transmission is selected only in a case where the frequency channel used for previous data transmission belongs to the basic group or the second backup group (step S823). Thereafter, the control unit 120 performs a data transmission process via the frequency channel used for previous data transmission (step S836).

In a case where the transmission frequency channel is selected (step S830), the control unit 120 acquires frequency channel information contained in a reference signal received via the frequency channel selected as the transmission frequency channel (step S831). The control unit 120 is capable of recognizing the frequency channel belonging to the first backup group on the basis of the acquired frequency channel information (information about frequency channel belonging to first backup group).

In addition, the control unit 120 allows the storage unit 130 to retain the acquired frequency channel information and information about an acquisition time in association with each other (step S831). Note that the acquired frequency channel information is not used for transmission, but is only retained. In addition, for data transmission, the frequency channel selected by a process for selecting transmission frequency channel candidate (step S830) is used (step S836).

In addition, in a case where it is determined not to execute a scan operation (step S824), or in a case where no transmission frequency channel candidate is detected (step S829), the control unit 120 determines whether or not frequency channel information has been previously acquired and retained (step S832).

In a case where frequency channel information has been previously acquired and retained (step S832), the control unit 120 checks the term of validity of the frequency channel information on the basis of the time information associated with the retained frequency channel information (step S833). For example, in a case where it is determined that a fixed time has not yet elapsed from the acquisition time of the frequency channel information, the control unit 120 determines that the frequency channel information as valid. On the other hand, in a case where it is determined that the fixed time or longer has elapsed from the acquisition time of the frequency channel information, the control unit 120 determines the frequency channel information as invalid. Note that the fixed time may be either a fixed value, or a value set by a user operation. In addition, the fixed value, in a case where adopted as the fixed time, may be a relatively short time (such as 15 through 30 minutes), for example.

In a case where it is determined that the frequency channel information is invalid (step S833), the flow proceeds to step S835. On the other hand, in a case where it is determined that the frequency channel information is valid (step S833), the control unit 120 selects a transmission frequency channel from the frequency channels belonging to the first backup group (step S834). The method for this selection is similar to the method for selection shown in FIG. 7 (method for selecting transmission frequency channel from frequency channels belonging to backup group) (step S809).

As described above, the control unit 120 may retain information about the first backup group (frequency channel information) in a case where this information (frequency channel information) is contained in a reference signal. In this case, the control unit 120 may select a frequency channel for data transmission from the first backup group in a case where reception power of all the plurality of reference signals is low with respect to a threshold in a state that the information about the first backup group is retained.

In this case, the control unit 120 may select a frequency channel for data transmission from the first backup group only when the information about the first backup group is retained and meets fixed conditions. On the other hand, when the information about the first backup group is retained but does not meet the fixed conditions, the control unit 120 may select a frequency channel for data transmission from the second backup group.

More specifically, when information about the first backup group within a valid term is retained, the control unit 120 may select a frequency channel for data transmission from the first backup group. On the other hand, when retained information about the first backup group is information after an elapse of the term of validity, the control unit 120 may select a frequency channel for data transmission from the second backup group.

In addition, in a case where the position of the wireless communication device 100 shifts within a range of a threshold, the control unit 120 may select a frequency channel used for last data transmission.

As described above, the communication range of the wireless sensor network expands without limitation to the communication range imposed by the reception performance of the wireless communication device. According to this embodiment, reduction of the number of base stations constituting the network, and therefore reduction of costs of the communication system are realizable.

In addition, frequency channels belonging to the first backup group and frequency channels belonging to the second backup group may be selectively used in areas in which signals are difficult to receive by the wireless communication device from the base station (such as area outside dotted-line circle 31 shown in FIG. 9). In this case, interference between signals transmitted from a plurality of the wireless communication devices in both the areas (area outside dotted-line circle 31 shown in FIG. 9) is avoidable in the base station.

3. Third Embodiment

According to the example presented in the second embodiment of the present technology, a frequency channel belonging to the first backup group or the second backup group is selected on the basis of a term of validity of frequency channel information about the first backup group. Discussed in the third embodiment of the present technology is an example which selects a frequency channel belonging to a first backup group or a second backup group on the basis of positional information about a wireless communication device or a base station.

Note that configurations of respective devices according to the third embodiment of the present technology are substantially identical to the corresponding configurations of the wireless communication devices 100 through 102 and the base stations 200 and 201 shown in FIG. 1 and other figures. Accordingly, parts common to the corresponding parts of the first embodiment of the present technology are given reference numbers identical to the corresponding reference numbers of the first embodiment of the present technology. A part of description about these parts is omitted.

[Registration Example Determining Positional Information Acquired by Wireless Communication Device as Reference Position]

Figure 11:
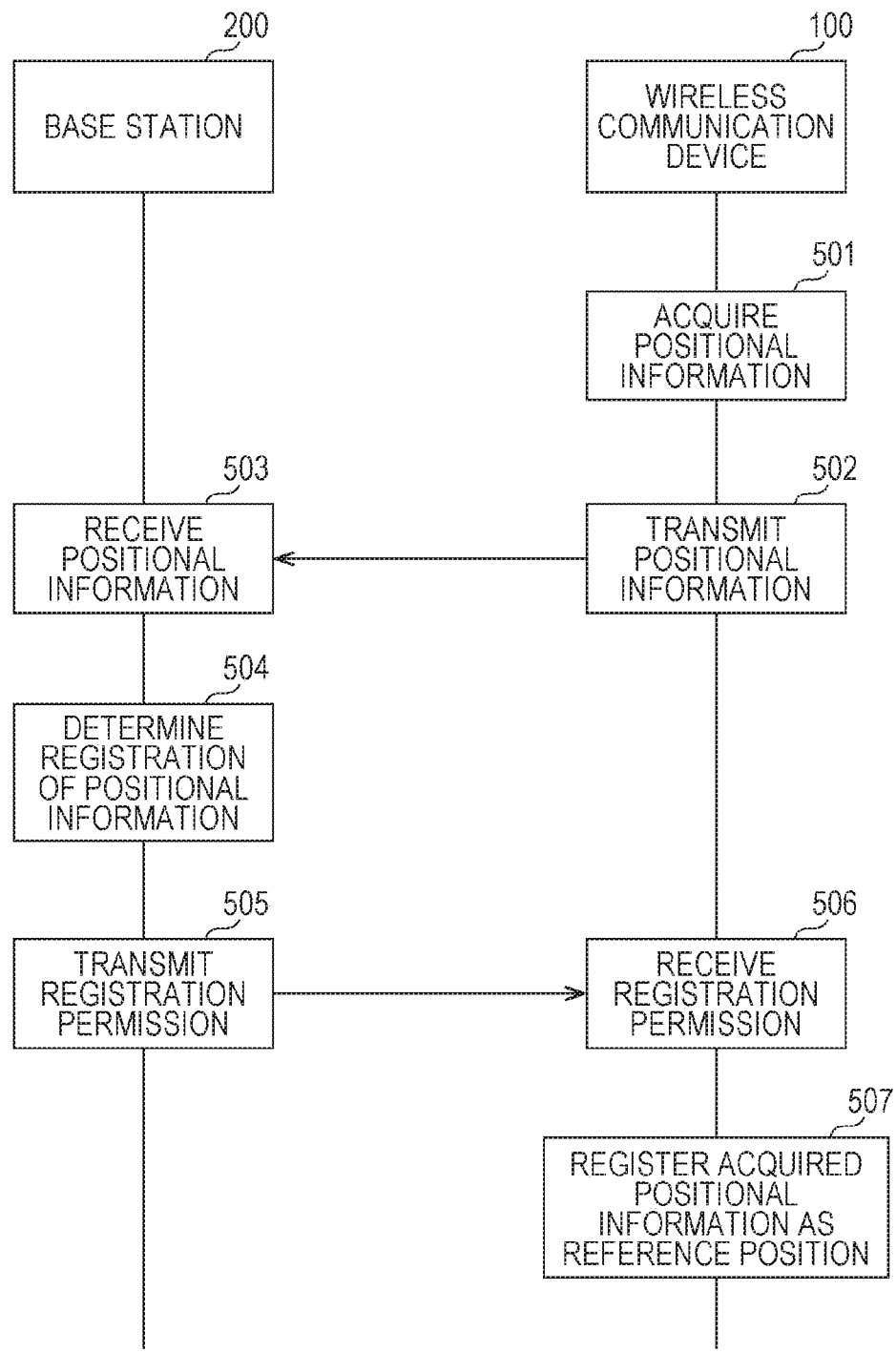
FIG. 11 is a sequence chart showing a communication example in a case where the wireless communication device 100 according to a third embodiment of the present technology registers positional information.

FIG. 11 is a sequence chart showing a communication example of registration of positional information by the wireless communication device 100 according to the third embodiment of the present technology. FIG. 11 shows an example of exchange between the wireless communication device 100 and the base station 200. In addition, according to the example of FIG. 11, it is assumed that the information acquisition unit 140 included in the wireless communication device 100 is capable of acquiring positional information.

Initially, the control unit 120 of the wireless communication device 100 acquires positional information acquired by the information acquisition unit 140 (501). Note that it is assumed that the information acquisition unit 140 acquires positional information regularly or irregularly (on such occasion as change of state of wireless communication device 100), and outputs the acquired positional information to the control unit 120.

Subsequently, the control unit 120 of the wireless communication device 100 transmits the acquired positional information to the base station 200 in a state that connection with the base station 200 is allowed via a frequency channel belonging to the basic group (502, 503). In other words, the wireless communication device 100 reports the positional information about the wireless communication device 100 to the base station 200 (502, 503).

The control unit 220 of the base station 200 having received the positional information from the wireless communication device 100 (503) determines whether to register the received positional information in the wireless communication device 100 (504). For example, the control unit 220 of the base station 200 may make this determination on the basis of a relationship between an identifier of the base station 200 and an identifier of the wireless communication device 100. Alternatively, for example, the control unit 220 of the base station 200 may make this determination on the basis of a frequency channel used for transmission of the positional information, and on a country code. For example, the control unit 220 of the base station 200 may determine to register the received positional information in the wireless communication device 100 in a case where the frequency channel used for transmission of the positional information belongs to the basic group in a state that the country code indicates a predetermined country (such as Japan). Note that the country code is contained in information transmitted from the wireless communication device 100.

Subsequently, the control unit 220 of the base station 200 notifies the wireless communication device 100 of a determination result (505, 506). For example, in a case where registration of the received positional information in the wireless communication device 100 is determined (504), the control unit 220 of the base station 200 transmits registration permission to the wireless communication device 100 (505, 506) for this notification. On the other hand, in a case where prohibition of registration of the received positional information in the wireless communication device 100 is determined (504), the control unit 220 of the base station 200 transmits registration prohibition to the wireless communication device 100 for this notification.

The control unit 120 of the wireless communication device 100 having received registration permission from the base station 200 (506) registers the positional information acquired by the information acquisition unit 140 (positional information transmitted to base station 200) as a reference position (507). For example, the control unit 120 of the wireless communication device 100 allows the storage unit 130 to retain the positional information acquired by the information acquisition unit 140 as a reference position (507). In this case, the control unit 120 of the wireless communication device 100 allows the storage unit 130 to retain the current time (registration time) in association with the reference position (507).

[Registration Example Determining Positional Information about Base Station as Reference Position]

Figure 12:
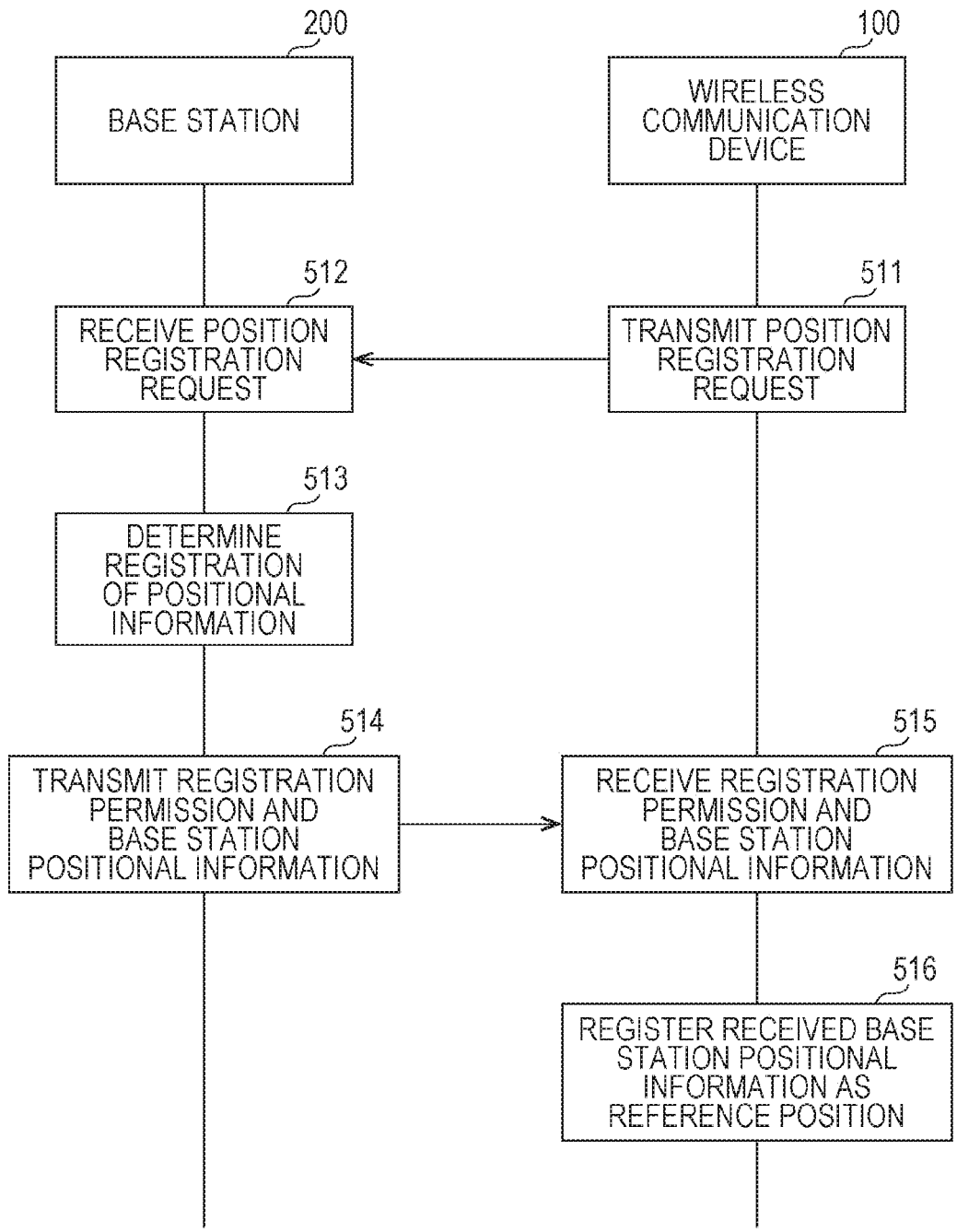
FIG. 12 is a sequence chart showing a communication example in a case where the wireless communication device 100 according to the third embodiment of the present technology registers positional information.

FIG. 12 is a sequence chart showing a communication example of registration of positional information by the wireless communication device 100 according to the third embodiment of the present technology. FIG. 12 shows exchange between the wireless communication device 100 and the base station 200. In addition, according to the example of FIG. 12, it is assumed that the wireless communication device 100 does not include a positional information acquisition unit.

Initially, the control unit 120 of the wireless communication device 100 transmits a message of a position registration request to the base station 200 in a state that connection with the base station 200 is allowed via a frequency channel belonging to the basic group (511, 512). In other words, the wireless communication device 100 reports the message of the position registration request to the base station 200 (511, 512).

The control unit 220 of the base station 200 having received the message of the position registration request from the wireless communication device 100 (512) determines whether to register positional information about the base station 200 in the wireless communication device 100 (513). Note that this determination is similar to the determination example (504) shown in FIG. 11.

Subsequently, the control unit 220 of the base station 200 notifies the wireless communication device 100 of a determination result (registration permission) and the positional information about the base station 200 (514, 515). For example, in a case where registration of the positional information about the base station 200 in the wireless communication device 100 is determined (513), the control unit 220 of the base station 200 transmits the registration permission for this notification and the positional information about the base station 200 to the wireless communication device 100 (514, 515). Note that in a case where prohibition of registration of the positional information about the base station 200 in the wireless communication device 100 is determined (513), the control unit 220 of the base station 200 transmits registration prohibition to the wireless communication device 100 for this notification.

The control unit 120 of the wireless communication device 100 having received registration permission and the positional information from the base station 200 (515) registers the positional information about the base station 200 thus received as a reference position (516). For example, the control unit 120 of the wireless communication device 100 allows the storage unit 130 to retain the received positional information about the base station 200 as a reference position (516). In this case, the control unit 120 of the wireless communication device 100 allows the storage unit 130 to retain the current time (registration time) in association with the reference position (516).

As described above, the wireless communication device 100 is capable of registering a reference position by exchanging positional information with the base station 200. Note that while the registration example which determines positional information acquired by the wireless communication device 100 as a reference position (FIG. 11), and the registration example which determines positional information about the base station 200 as a reference position (FIG. 12) have been discussed as methods for registering a reference position, other methods may be used for this registration. In addition, the registration method for registering a reference position may be registered at the time of shipment of the wireless communication device 100.

Accordingly, the control unit 120 of the wireless communication device 100 is capable of retaining positional information about the wireless communication device 100, or positional information about other devices (such as base stations 200, 201).

[Operation Example of Wireless Communication device]

Figure 13:
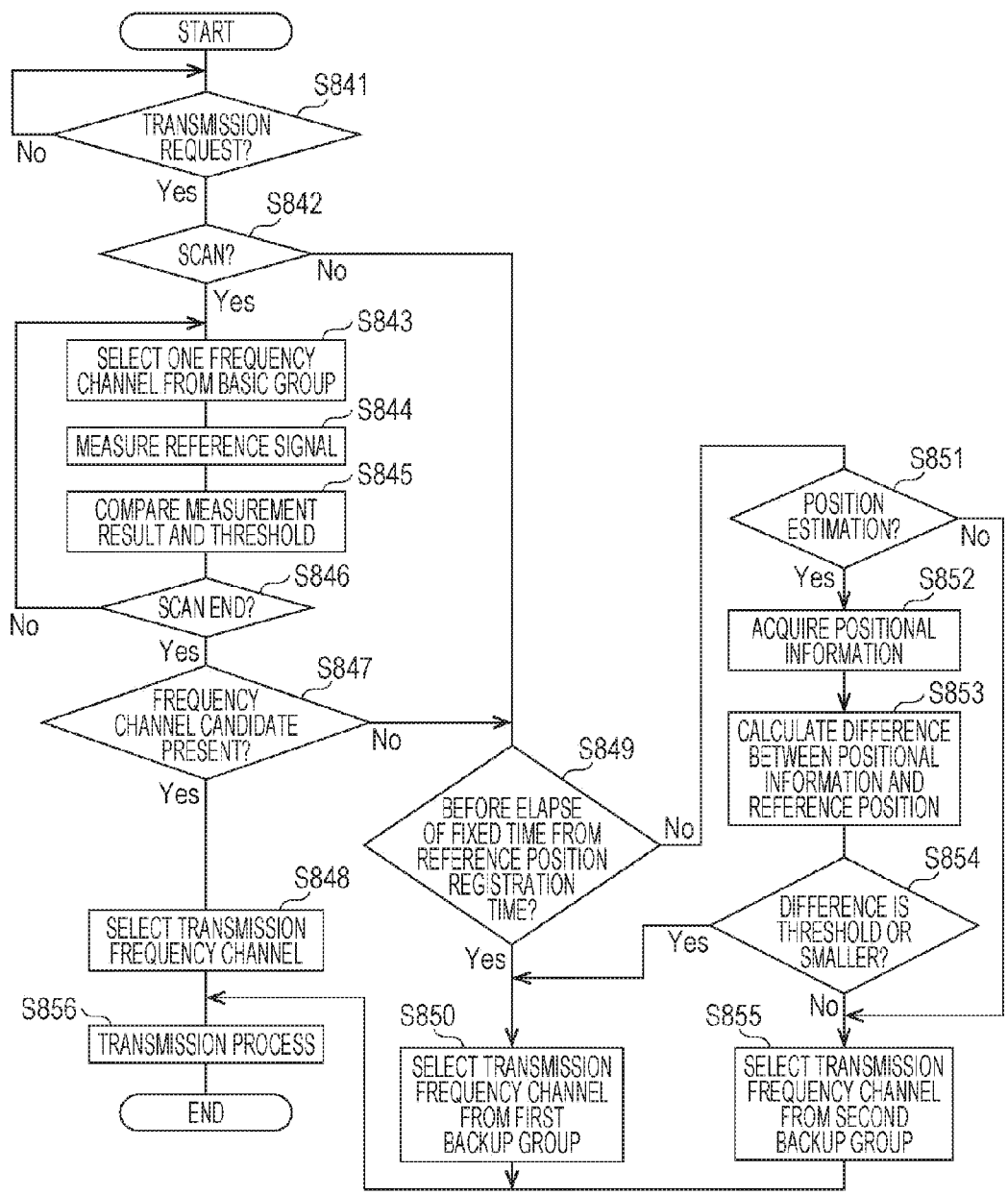
FIG. 13 is a flowchart showing an example of processing procedures of a transmission process performed by the wireless communication device 100 according to the third embodiment of the present technology.

FIG. 13 is a flowchart showing an example of processing procedures of a transmission process performed by the wireless communication device 100 according to the third embodiment of the present technology. Note that an operation example shown in FIG. 13 is a modified example of the example shown in FIG. 7. Accordingly, a part of description of processing procedures common to the corresponding procedures in FIG. 7 is omitted.

Processing procedures shown in FIG. 13 (steps S841 through S848, S855, S856) correspond to the processing procedures shown in FIG. 7 (steps S801 through S810).

In a case where it is determined not to execute a scan operation (step S842), or in a case where no transmission frequency channel candidate is detected (step S847), the control unit 120 determines whether or not a fixed time has elapsed from the registration time of the reference position (step S849). More specifically, the control unit 120 compares the current time with the registration time retained in the storage unit 130 in association with the reference position, and determines whether or not the fixed time has elapsed from the registration time (step S849). Note that the fixed time may be either a fixed value, or a value set by a user operation. In addition, the fixed value, in a case where adopted as the fixed time, may be a relatively short time (such as 15 through 30 minutes), for example.

In a case where it is determined that the fixed time has not yet elapsed from the registration time of the reference position (step S849), the control unit 120 selects a transmission frequency channel from frequency channels belonging to the first backup group (step S850). This selection method is similar to the selection method shown in FIG. 10 (step S834).

In a case where it is determined that the fixed time has elapsed from the registration time of the reference position (step S849), the control unit 120 determines whether to execute position estimation (step S851). For example, whether to reacquire the positional information is determined in a case where the wireless communication device 100 includes a positional information acquisition unit (step S851). For example, it may be determined not to reacquire the positional information in a case where a battery residual quantity is small (step S851). On the other hand, for example, it may be determined not to execute position estimation in a case where the wireless communication device 100 does not include a positional information acquisition unit (step S851). In a case where it is determined not to execute position estimation as in this case (step S851), the flow proceeds to step S855.

In a case where execution of position estimation is determined (step S851), the control unit 120 acquires the positional information acquired by the information acquisition unit 140 (step S852). Subsequently, the control unit 120 calculates a difference between the positional information registered as a reference position and the reacquired positional information (step S853). For example, the control unit 120 calculates a distance between two points of the reference position and the position specified by the reacquired positional information. For example, the distance between the two points may be calculated on the basis of the latitudes and longitudes of the respective positions.

Subsequently, the control unit 120 determines whether or not the calculated difference is a threshold or smaller (step S854). This threshold may be set on the basis of the number of base stations provided within the area. For example, the threshold may be set to a small value in a case where the number of base stations provided within the area is large. On the other hand, the threshold may be set to a large value in a case where the number of base stations provided within the area is small. Note that the threshold is not required to be set in this manner, but may be determined otherwise.

In a case where the calculated difference is the threshold or smaller (step S854), the flow proceeds to step S850. On the other hand, in a case where the calculated difference exceeds the threshold (step S854), the flow proceeds to step S855.

Accordingly, the control unit 120 may select a frequency channel for data transmission on the basis of retained positional information in a case where reception power of all of a plurality of reference signals received via all the frequency channels belonging to the basic group is low with respect to a threshold. For example, the control unit 120 may select a frequency channel for data transmission from the first backup group when positional information is retained and meets a fixed condition. On the other hand, the control unit 120 may select a frequency channel for data transmission from the second backup group when positional information is retained but does not meet the fixed condition.

More specifically, the control unit 120 may select a frequency channel for data transmission from the first backup group when positional information within a term of validity is retained. On the other hand, the control unit 120 may select a frequency channel for data transmission from the second backup group when retained positional information is information after an elapse of a term of validity.

In addition, the control unit 120 acquires new positional information when retained positional information is information after an elapse of the term of validity, and selects a frequency channel for data transmission on the basis of a result of comparison between the positional information after an elapse of the term of validity and the new positional information.

As described above, the communication range of the wireless sensor network expands without limitation to the communication range imposed by the reception performance of the wireless communication device. According to this embodiment, reduction of the number of base stations constituting the network, and therefore reduction of costs of the communication system are realizable.

In addition, frequency channels belonging to the first backup group and frequency channels belonging to the second backup group may be selectively used in areas in which signals are difficult to receive by the wireless communication device from the base station (such as area outside dotted-line circle 31 shown in FIG. 9). In this case, interference between signals transmitted from a plurality of the wireless communication devices in both the areas (area outside dotted-line circle 31 shown in FIG. 9) is avoidable in the base station.

As described above, a range of bidirectional communication and a range of unidirectional communication between a base station (such as base stations 200, 201) and a wireless communication device (such as wireless communication devices 100 through 102) are overlaid with each other according to the embodiment of the present technology. The range of bidirectional communication herein corresponds to a range allowing transmission and reception by each of the base station and the wireless communication device (such as overlapped portion between dotted-line circles 21 and 22 shown in FIG. 2). On the other hand, the range of unidirectional communication corresponds to a range allowing transmission and reception only by either one of the base station and the wireless communication device (such as portion of dotted-line circle 22 excluding overlapped portion between dotted-line circles 21 and 22 in FIG. 2).

In a case where the bidirectional communication range and the unidirectional communication range are overlaid with each other as in this example, reduction of power consumption of the wireless communication device is realizable. Accordingly, use efficiency of frequency channels improves.

In addition, the reception sensitivity of the wireless communication device (such as wireless communication devices 100 through 102) may be set to a level lower than the reception sensitivity of the base station (such as base stations 200, 201). In a case where the reception sensitivity of the wireless communication device lowers with reduction of the power consumption of the wireless communication device, the wireless communication device is allowed to have a receivable range different from the receivable range of the base station in the communication system. In other words, the wireless communication device is allowed to perform a transmission process without the need of reception of signals transmitted from the base station.

According to the embodiment of the present technology, therefore, appropriate selection of transmission frequency channels is realizable in the communication system having asymmetric communication ranges. More specifically, a bidirectional communication range and a unidirectional communication range are overlaid with each other to reduce power consumption of the wireless communication device and improve use efficiency of frequency channels. In addition, appropriate data communication is achievable by utilizing wireless communication even between devices having different reception performance.

4. Application Example

The technology according to the present disclosure is applicable to various types of products. For example, each of the wireless communication devices 100 through 102 and the base stations 200 and 201 may be realized as a mobile terminal such as a smartphone, a tablet personal computer (PC), a laptop PC, a portable game machine terminal, and a digital camera, a fixed terminal such as a television receiver, a printer, a digital scanner, and a network storage, and an in-vehicle terminal such as a car navigation device. Alternatively, each of the wireless communication devices 100 through 102 and the base stations 200 and 201 may be realized as a terminal performing machine to machine (M2M) communication (also called machine type communication (MTC) terminal) such as a smart meter, a vending machine, a remote monitoring device, and a point of sale (POS) terminal. Instead, each of the wireless communication devices 100 through 102 and the base stations 200 and 201 may be provided as a wireless communication module mounted on these terminals (such as integrated circuit module formed with one die).

On the other hand, for example, each of the base stations 200 and 201 may be realized as a wireless LAN access point (also called wireless base station) having or not having a router function. Alternatively, each of the base stations 200 and 201 may be realized as a mobile wireless LAN router. Instead, each of the base stations 200 and 201 may be provided as a wireless communication module mounted on these devices (such as integrated circuit module formed with one die).

4-1. First Application Example

Figure 14:
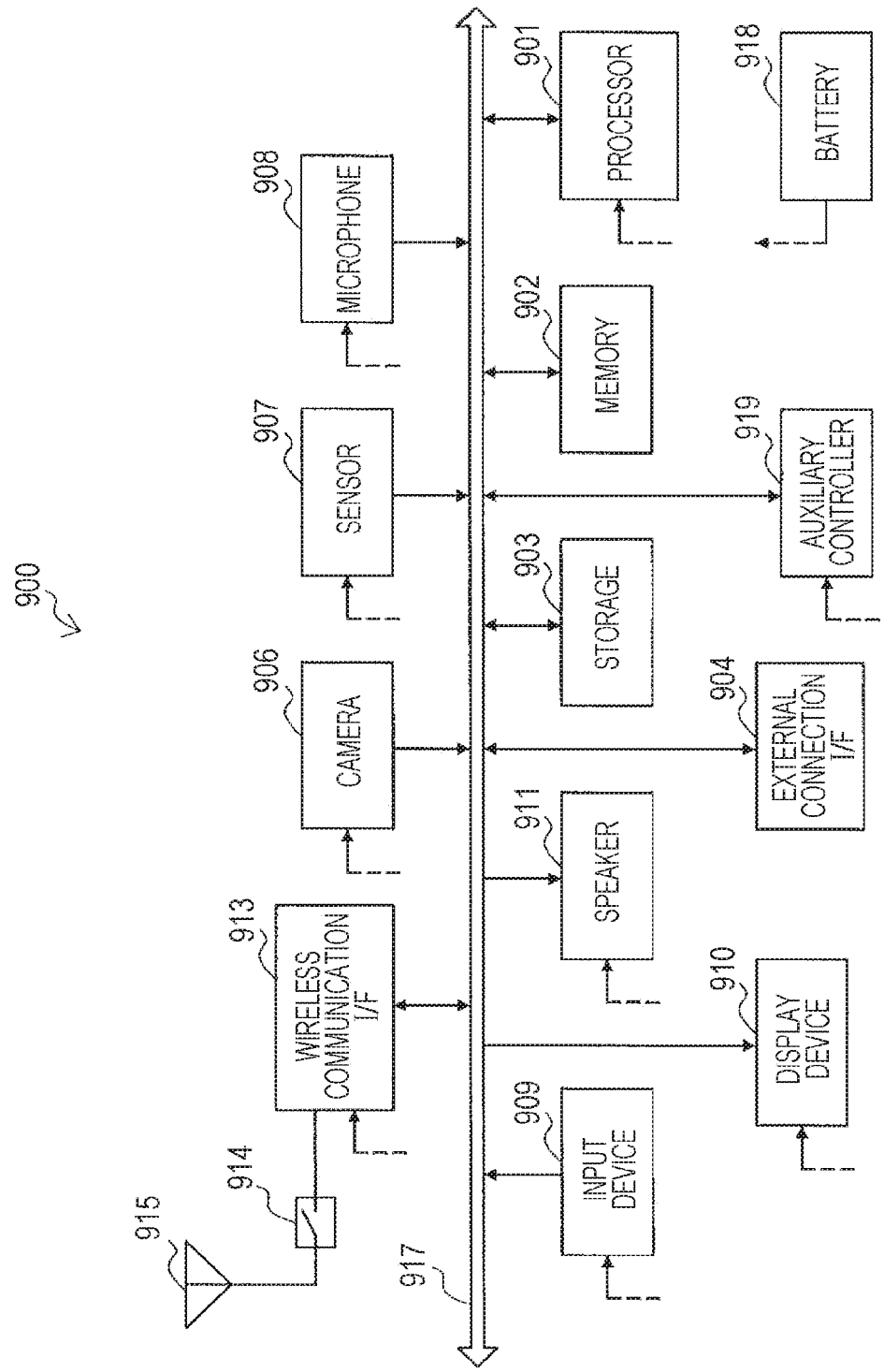
FIG. 14 is a block diagram showing an example of a general configuration of a smartphone.

FIG. 14 is a block diagram showing a general configuration example of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

For example, the processor 901 may be constituted by a central processing unit (CPU) or a system on chip (SoC), and controls functions of application layers or other layers of the smartphone 900. The memory 902 includes a random access memory (RAM) and a read only memory (ROM), and stores programs executed by the processor 901 and data. The storage 903 may include a storage medium such as a semiconductor memory and a hard disk. The external connection interface 904 is an interface for connecting an external device such as a memory card or a universal serial bus (USB) device to the smartphone 900.

The camera 906 includes an imaging device such as a charge coupled device (CCD) and a complementary metal oxide semiconductor (CMOS), and forms a captured image. The sensor 907 may include a sensor group such as a positioning sensor, a gyro sensor, a geomagnetic sensor, and an acceleration sensor. The microphone 908 converts voices input to the smartphone 900 into audio signals. The input device 909 includes a touch sensor for detecting a touch to a screen of the display device 910, a keypad, a keyboard, buttons, and switches, for example, and receives operations or information input from a user. The display device 910 includes a screen such as a liquid crystal display (LCD) and an organic light emitting diode (OLED) display, and displays an output image from the smartphone 900. The speaker 911 converts audio signals output from the smartphone 900 into voices.

The wireless communication interface 913 supports one or more of wireless LAN standards such as IEEE 802.11a, 11b, 11g, 11n, 11ac, and 11ad, and executes wireless communication. The wireless communication interface 913 may communicate with other devices via wireless LAN access points in an infrastructure mode. In addition, the wireless communication interface 913 may directly communicate with other devices in a direct communication mode such as ad hoc mode and Wi-Fi direct. Note that one of two terminals operates as an access point in Wi-Fi Direct unlike the ad hoc mode. However, communication is directly executed between these terminals. Typically, the wireless communication interface 913 may include a baseband processor, a radio frequency (RF) circuit, a power amplifier and the like. The wireless communication interface 913 may be a one-chip module which integrates a memory storing a communication control program, a processor executing this program, and associated circuits. The wireless communication interface 913 may support other types of wireless communication system such as a short-range wireless communication system, a close wireless communication system, and a cellular communication system, as well as the wireless LAN system. Then antenna switch 914 switches connection of the antenna 915 between a plurality of circuits included in the wireless communication interface 913 (such as circuits for different wireless communication systems). The antenna 915 includes a single or a plurality of antenna elements (such as a plurality of antenna elements constituting MIMO antenna) used for wireless signal transmission and reception via the wireless communication interface 913.

Note that the smartphone 900 is not required to have the configuration shown in FIG. 14 as an example, but may include a plurality of antennas (such as wireless LAN antenna and close wireless communication system antenna). In this case, the antenna switch 914 may be eliminated from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to respective blocks of the smartphone 900 shown in FIG. 14 via a power supply line a part of which is indicated by dotted lines in the figure. The auxiliary controller 919 secures operations associated with minimum necessary functions of the smartphone 900 in a sleep mode, for example.

According to the smartphone 900 shown in FIG. 14, the control unit 120 described with reference to FIG. 3 may be incorporated in the wireless communication interface 913. In addition, at least a part of the functions of the smartphone 900 may be incorporated in the processor 901 or the auxiliary controller 919.

Note that the smartphone 900 may operate as a wireless access point (software AP) by an application-level access point function executed by the processor 901. Alternatively, the wireless access point function may be performed by the wireless communication interface 913.

4-2. Second Application Example

Figure 15:
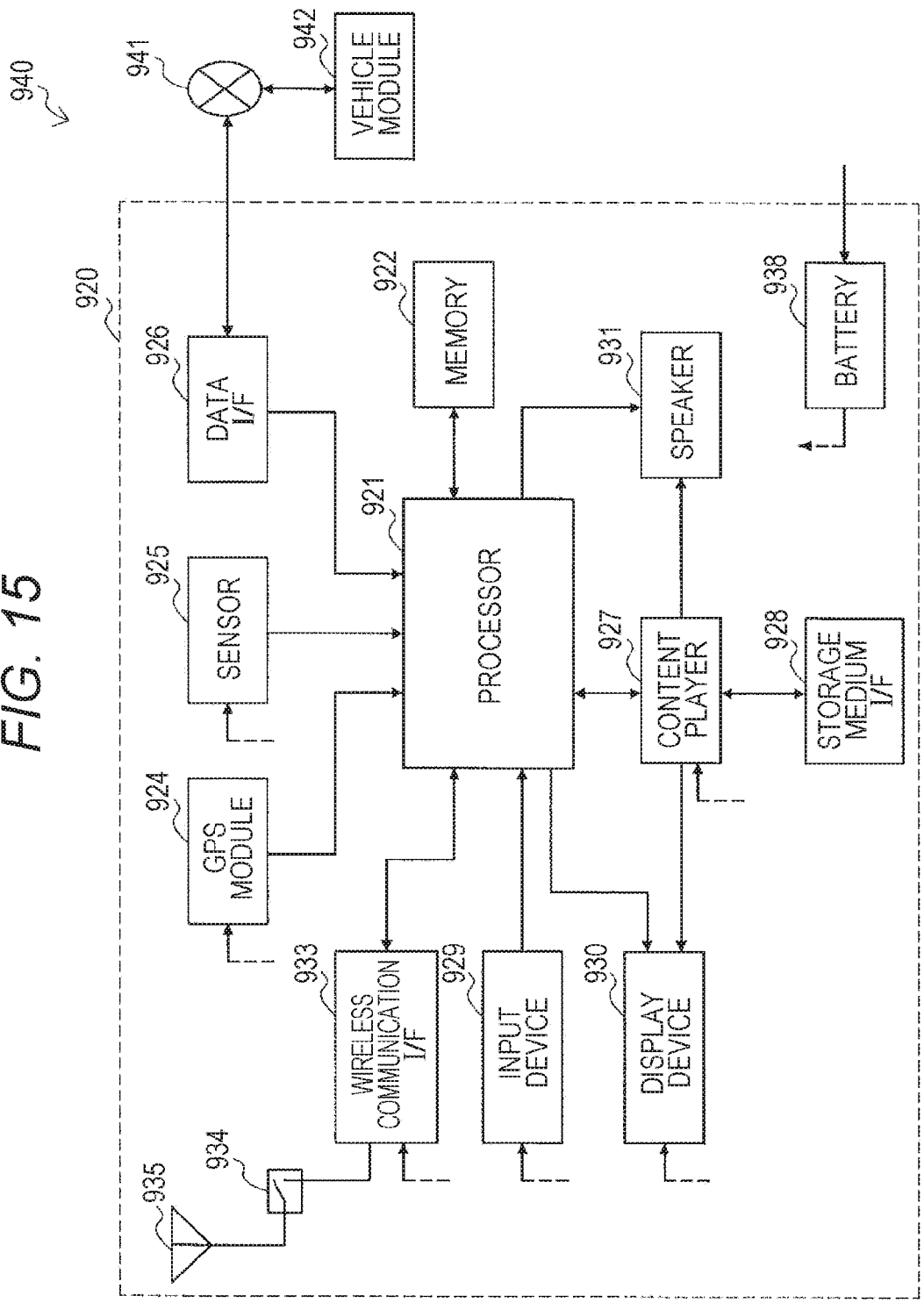
FIG. 15 is a block diagram showing an example of a general configuration of a car navigation device.

FIG. 15 is a block diagram showing an example of a general configuration of a car navigation device 920 to which the technology according to the present disclosure is applicable. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be constituted by a CPU or an SoC, and controls a navigation function and other functions of the car navigation device 920. The memory 922 includes a RAM and a ROM, and stores programs executed by the processor 921 and data.

The GPS module 924 measures a position of the car navigation device 920 (such as latitude, longitude, and altitude) on the basis of GPS signals received from a GPS satellite. For example, the sensor 925 may include a sensor group such as a gyro sensor, a geomagnetic sensor, and a pressure sensor. The data interface 926 is connected to an in-vehicle network 941 via a not-shown terminal to obtain data generated by a vehicle such as vehicle speed data.

The content player 927 reproduces content stored in a storage medium (such as CD and DVD) inserted into the storage medium interface 928. For example, the input device 929 includes a touch sensor for detecting a touch to a screen of the display device 930, buttons, switches and the like, and receives operations or information input from a user. The display device 930 includes a screen such as an LCD display and an OLED display, and displays navigation functions or images of content to be reproduced. The speaker 931 outputs navigation functions or voices of content to be reproduced.

The wireless communication interface 933 supports one or more of wireless LAN standards such as IEEE 802.11a, 11b, 11g, 11n, 11ac, and 11ad, and executes wireless communication. The wireless communication interface 933 may communicate with other devices via wireless LAN access points in an infrastructure mode. In addition, the wireless communication interface 933 may directly communicate with other devices in a direct communication mode such as ad hoc mode and Wi-Fi direct. Typically, the wireless communication interface 933 may include a baseband processor, an RF circuit, a power amplifier and the like. The wireless communication interface 933 may be a one-chip module which integrates a memory storing a communication control program, a processor executing this program, and associated circuits. The wireless communication interface 933 may support other types of wireless communication system such as a short-range wireless communication system, a close wireless communication system, and a cellular communication system, as well as the wireless LAN system. The antenna switch 934 switches connection of the antenna 935 between a plurality of circuits included in the wireless communication interface 933. The antenna 935 includes a single or a plurality of antenna elements used for wireless signal transmission and reception via the wireless communication interface 933.

Note that the car navigation device 920 is not required to have the configuration of the example shown in FIG. 15, but may include a plurality of antennas. In this case, the antenna switch 934 may be eliminated from the configuration of the car navigation device 920.

The battery 938 supplies power to respective blocks of the car navigation device 920 shown in FIG. 15 via a power supply line a part of which is indicated by dotted lines in the figure. In addition, the battery 938 accumulates power supplied from the vehicle.

According to the car navigation device 920 shown in FIG. 15, the control unit 120 described with reference to FIG. 3 may be incorporated in the wireless communication interface 933. In addition, at least a part of the functions of the car navigation device 920 may be incorporated in the processor 921.

In addition, the wireless communication interface 933 may function as the base station 200 or 201 described above to provide wireless connection to a terminal carried by a user present in the vehicle.

Furthermore, the technology according to the present disclosure may be realized as an in-vehicle system (or vehicle) 940 which includes one or more blocks of the car navigation device 920 described above, an in-vehicle network 941, and a vehicle module 942. The vehicle module 942 generates vehicle data such as a vehicle speed, an engine speed, and malfunction information, and outputs the generated data to the in-vehicle network 941.

4-3. Third Application Example

FIG. 16 is a block diagram showing an example of a general configuration of a wireless access point 950 to which the technology according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be constituted by a CPU or a digital signal processor (DSP), for example, and performs various functions of layers higher than an Internet protocol (IP) of the wireless access point 950 (such as access limitation, routing, encryption, fire wall, and log management). The memory 952 includes a RAM and a ROM, and stores programs executed by the controller 951, and various types of control data (such as terminal list, routing table, encryption key, security setting, and log).

The input device 954 includes buttons, switches or the like, and receives an operation from a user. The display device 955 includes an LED lamp or the like, and displays an operation status of the wireless access point 950.

The network interface 957 is a wired communication interface providing connection between the wireless access point 950 and a wired communication network 958. The network interface 957 may include a plurality of connection terminals. The wired communication network 958 may be a LAN such as Ethernet (registered trademark), or may be a wide area network (WAN).

The wireless communication interface 963 supports one or more of wireless LAN standards such as IEEE 802.11a, 11b, 11g, 11n, 11ac, and 11ad, and provides wireless connection as an access point to a near terminal. Typically, the wireless communication interface 963 may include a baseband processor, an RF circuit, a power amplifier and the like. The wireless communication interface 963 may be a one-chip module which integrates a memory storing a communication control program, a processor executing this program, and associated circuits. The antenna switch 964 switches connection of the antenna 965 between a plurality of circuits included in the wireless communication interface 963. The antenna 965 includes a single or a plurality of antenna elements used for wireless signal transmission and reception via the wireless communication interface 963.

According to the wireless access point 950 shown in FIG. 16, the control unit 120 described with reference to FIG. 3, and the control unit 220 described with reference to FIG. 4 may be incorporated in the wireless communication interface 963. In addition, at least a part of the functions of the wireless access point 950 may be incorporated in the controller 951.

Note that the embodiments described herein are presented only byway of example embodying the present technology. Matters included in the embodiments and matters specifying the invention according to the appended claims correlate with each other. Similarly, the matters specifying the invention according to the appended claims, and matters included in the embodiments of the present technology and given names identical to the corresponding matters specifying the invention correlate with each other. However, the present technology is not limited to the embodiments herein, but may be realized with various modifications of the embodiments without departing from the subject matters of the embodiments.

In addition, the processing procedures described in the foregoing embodiments may be considered as a method including a series of these procedures, as a program under which a computer executes the series of procedures, or as a recording medium in which the program is stored. The recording medium may be constituted by a compact disc (CD), a minidisc (MD), a digital versatile disc (DVD), a memory card, a Blu-ray (registered trademark) disc, or others.

Note that effects to be produced are not limited to the effects described in the present specification presented only by way of example. Additional effects may be also produced.

Note that the present technology may have following configurations.

(1)

A wireless communication device including:

a communication unit that performs data transmission to a different device via one of frequency channels classified into a plurality of groups that includes a first group and a second group; and a control unit that selects one of the frequency channels for the data transmission from the first group or the second group on the basis of a result of detection of a reference signal transmitted from the different device via one of the frequency channels belonging to the first group.

(2)

The wireless communication device according to (1) noted above, in which the control unit compares a threshold and reception power of the reference signal received via one of the frequency channels belonging to the first group, and determines whether to select the corresponding frequency channel on the basis of a result of the comparison.

(3)

The wireless communication device according to (2) noted above, in which, in a case where the reception power of the reference signal received via one of the frequency channels belonging to the first group is high with respect to the threshold, the control unit selects the corresponding frequency channel.

(4)

The wireless communication device according to (2) or (3) noted above, in which, in a case where the reception power of all of a plurality of the reference signals received via all the frequency channels belonging to the first group is low with respect to the threshold, the control unit selects one of the frequency channels for the data transmission from the second group.

(5)

The wireless communication device according to (4) noted above, in which the control unit retains information about a third group constituting the plurality of groups in a case where the information about the third group is contained in the reference signal, and selects one of the frequency channels for the data transmission from the third group in a case where the reception power of all the plurality of reference signals is low with respect to the threshold in a state that the information about the third group is retained.

(6)

The wireless communication device according to (5) noted above, in which the control unit selects one of the frequency channels for the data transmission from the third group in a case where the reception power of all the plurality of reference signals is low with respect to the threshold in a state that the information about the third group is retained, and that the information meets a fixed condition, and the control unit selects one of the frequency channels for the data transmission from the second group in a case where the reception power of all the plurality of reference signals is low with respect to the threshold in a state that the information about the third group is retained, and that the information does not meet the fixed condition.

(7)

The wireless communication device according to (5) noted above, in which the control unit selects one of the frequency channels for the data transmission from the third group in a case where the reception power of all the plurality of reference signals is low with respect to the threshold in a state that the retained information about the third group is information within a term of validity, and the control unit selects one of the frequency channels for the data transmission from the second group in a case where the reception power of all the plurality of reference signals is low with respect to the threshold in a state that the retained information about the third group is after an elapse of the term of validity.

(8)

The wireless communication device according to (2) or (3) noted above, in which the control unit retains positional information about the wireless communication device or about the different device, and selects one of the frequency channels for the data transmission from the third group in a case where the reception power of all the plurality of reference signals received via all the frequency channels belonging to the first group is low with respect to the threshold in a state that the positional information is retained, and that the positional information meets a fixed condition, and the control unit selects one of the frequency channels for the data transmission from the second group in a case where the reception power of all the plurality of reference signals received via all the frequency channels belonging to the first group is low with respect to the threshold in a state that the positional information is retained, and that the positional information does not meet the fixed condition.

(9)

The wireless communication device according to (8) noted above, in which the control unit selects one of the frequency channels for the data transmission from the third group in a case where the reception power of all the plurality of reference signals is low with respect to the threshold in a state that the retained positional information is information within a term of validity, and the control unit selects one of the frequency channels for the data transmission from the second group in a case where the reception power of all the plurality of reference signals is low with respect to the threshold in a state that the retained positional information is information after an elapse of the term of validity.

(10)

The wireless communication device according to (8) noted above, in which the control unit acquires new positional information in a case where the reception power of all the plurality of reference signals is low with respect to the threshold in a state that the retained positional information is information after an elapse of the term of validity, and selects one of the frequency channels for the data transmission from the second group or the third group on the basis of a result of comparison between the positional information after the elapse of the term of validity and the new positional information.

(11)

The wireless communication device according to any one of (1) through (10) noted above, in which the control unit selects the frequency channel used for last data transmission in a case where a position of the wireless communication device has shifted within a range defined on the basis of a threshold.

(12)

The wireless communication device according to any one of (1) through (11) noted above, in which the control unit determines, on the basis of a battery residual quantity, whether to detect the reference signal via one of the frequency channels belonging to the first group.

(13)

The wireless communication device according to (12) noted above, in which the control unit selects one of the frequency channels for the data transmission from the second group without detecting the reference signal via the frequency channel belonging to the first group in a case where the battery residual quantity is small with respect to a threshold.

(14)

The wireless communication device according to any one of (1) through (13) noted above, in which a range of bidirectional communication between the different device and the wireless communication device, and a range of only unidirectional communication between the different device and the wireless communication device are overlaid with each other.

(15)

The wireless communication device according to any one of (1) through (14) noted above, in which reception sensitivity of the wireless communication device is lower than reception sensitivity of the different device.

(16)

A wireless communication device including:

a first communication unit and a second communication unit each of which performs transmission and reception operations via one of frequency channels classified into a plurality of groups that includes a first group and a second group; and a control unit that allows the first communication unit to execute a transmission operation for transmitting a reference signal at a predetermined time via one of frequency channels belonging to the first group, and a reception operation performed in a time zone different from the predetermined time via the corresponding frequency channel, and allows the second communication unit to execute transmission and reception operations via one of the frequency channels belonging to the second group.

(17)

The wireless communication device according to (16) noted above, in which the control unit allows the first communication unit to transmit the reference signal in a state that the reference signal contains information about a third group constituting the plurality of groups.

(18)

A communication system including:

a first wireless communication device that includes a first communication unit and a second communication unit each of which performs transmission and reception operations via one of frequency channels classified into a plurality of groups that includes a first group and a second group, and a control unit that allows the first communication unit to execute a transmission operation for transmitting a reference signal at a predetermined time via one of frequency channels belonging to the first group, and a reception operation performed in a time zone different from the predetermined time via the corresponding frequency channel, and allows the second communication unit to execute a reception operation via one of the frequency channels belonging to the second group; and a second wireless communication device that includes a communication unit that performs data transmission to the first wireless communication device via one of the frequency channels classified into the plurality of groups, and a control unit that selects one of the frequency channels for the data transmission from the first group or the second group on the basis of a result of detection of the reference signal transmitted from the first wireless communication device via one of the frequency channels belonging to the first group.

(19)

An information processing method including:

a first procedure that detects a reference signal transmitted from a different device via one of frequency channels belonging to a first group for data transmission to the different device via one of the frequency channels classified into a plurality of groups that includes the first group and a second group; and a second procedure that selects one of the frequency channels for the data transmission from the first group or the second group on the basis of a result of detection of the reference signal.

(20)

A program under which a computer executes:

a first procedure that detects a reference signal transmitted from a different device via one of frequency channels belonging to a first group for data transmission via one of the frequency channels classified into a plurality of groups that includes the first group and a second group; and a second procedure that selects one of the frequency channels for the data transmission from the first group or the second group on the basis of a result of detection of the reference signal.

REFERENCE SIGNS LIST

10 Communication system
100 to 102 Wireless communication device
110 Communication unit
120 Control unit
130 Storage unit
140 Information acquisition unit
150 Power supply unit
200, 201 Base station
211 First communication unit
212 Second communication unit
213 Third communication unit 214 kth communication unit
220 Control unit
230 Storage unit
300 Information processing device
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle module
950 Wireless access point
951 Controller
952 Memory
954 Input device
955 Display device
957 Network interface
958 Wired communication network
963 Wireless communication interface
964 Antenna switch
965 Antenna

The invention claimed is:

1. A first wireless communication device, comprising:
circuitry configured to:
transmit data to a second wireless communication device via a first frequency channel of a plurality of frequency channels, wherein
the plurality of frequency channels is classified into a plurality of groups, and
the plurality of groups includes a first group and a second group;
compare a set threshold and reception power of a reference signal received via a second frequency channel of the plurality of frequency channels that belongs to the first group;
determine a selection of the first frequency channel of the plurality of frequency channels based on the comparison;
retain information associated with a third group of the plurality of groups, wherein the information associated with the third group is contained in the reference signal; and
select the first frequency channel of the plurality of frequency channels from one of the second group or the third group based on the reception power of the reference signal that is lower than the set threshold.

2. The first wireless communication device according to claim 1, wherein the circuitry is further configured to select the first frequency channel of the plurality of frequency channels of the first group based on the reception power that is higher than the set threshold.

3. The first wireless communication device according to claim 1, wherein the circuitry is further configured to:
select the first frequency channel of the plurality of frequency channels from the third group based on the reception power that is lower than the set threshold and based on a determination that the information meets a fixed condition; and
select the first frequency channel of the plurality of frequency channels from the second group based on the reception power that is lower than the set threshold and based on a determination that the information does not meet the fixed condition.

4. The first wireless communication device according to claim 1, wherein the circuitry is further configured to:
select the first frequency channel of the plurality of frequency channels from the third group based on the reception power that is lower than the set threshold, in a state that the retained information about the third group is within a term of validity; and
select the first frequency channel of the plurality of frequency channels from the second group based on the reception power that is lower than the set threshold, in a state that the retained information about the third group is after an elapse of the term of validity.

5. The first wireless communication device according to claim 1, wherein the circuitry is further configured to:
retain first positional information associated with one of the first wireless communication device or the second wireless communication device; and
select the first frequency channel of the plurality of frequency channels from a third group based on the reception power that is lower than the set threshold in a state that the first positional information meets a fixed condition; and
select the first frequency channel of the plurality of frequency channels from the second group based on the reception power that is lower than the set threshold in a state that the first positional information does not meet the fixed condition.

6. The first wireless communication device according to claim 5, wherein the circuitry is further configured to:
select the first frequency channel of the plurality of frequency channels from the third group based on the reception power that is lower than the set threshold in a state that the retained first positional information is within a term of validity; and
select the first frequency channel of the plurality of frequency channels from the second group based on the reception power that is lower than the set threshold in a state that the retained first positional information is after an elapse of the term of validity.

7. The first wireless communication device according to claim 5, wherein the circuitry is further configured to:

acquire second positional information based on the reception power that is lower than the set threshold in a state that the retained first positional information is after an elapse of a term of validity;

compare the first positional information after the elapse of the term of validity and the second positional information; and select the first frequency channel of the plurality of frequency channels from one of the second group or the third group based on the comparison between the first positional information after the elapse of the term of validity and the second positional information.

8. The first wireless communication device according to claim 1, wherein the circuitry is further configured to select the first frequency channel of the plurality of frequency channels for the transmission of the data, based on a shift in a position of the first wireless communication device within a range, wherein the range is defined based on a threshold.

9. The first wireless communication device according to claim 1, wherein the circuitry is further configured to determine whether to detect the reference signal via the second frequency channel of the plurality of frequency channels that belongs the first group, based on a battery residual quantity of the first wireless communication device.

10. The first wireless communication device according to claim 9, wherein the circuitry is further configured to select the first frequency channel of the plurality of frequency channels from the second group without detection of the reference signal in a case where the battery residual quantity is higher than a threshold.

11. The first wireless communication device according to claim 1, wherein a range of bidirectional communication between the second wireless communication device and the first wireless communication device, and a range of unidirectional communication between the second wireless communication device and the first wireless communication device are overlaid with each other.

12. The first wireless communication device according to claim 1, wherein reception sensitivity of the first wireless communication device is lower than reception sensitivity of the second wireless communication device.

13. A wireless communication device, comprising:
a first communication circuit; and
a second communication circuit, wherein
each of the first communication circuit and the second communication circuit is configured to execute transmission operation and reception operation via one of a plurality of frequency channels,
the plurality of frequency channels is classified into a plurality of groups,
the plurality of groups includes a first group and a second group,
the first communication circuit is further configured to:
transmit, to an external device, a reference signal at a determined time via a first frequency channel of the plurality of frequency channels that belongs the first group, wherein the reference signal is transmitted in a state that the reference signal contains information about a third group of the plurality of groups; and
execute the reception operation in a time zone that is different from the determined time via the first frequency channel of the plurality of frequency channels of the first group, the second communication circuit is configured to
execute the transmission operation and the reception operation via a second frequency channel of the plurality of frequency channels that belongs to the second group, and
the second frequency channel of the plurality of frequency channels is selected from one of the second group or the third group based on a reception power of the reference signal that is lower than a set threshold.

14. A communication system, comprising:
a first wireless communication device that includes a first communication circuit and a second communication circuit each configured to:
transmit and receive via one of a plurality of frequency channels, wherein
the plurality of frequency channels is classified into a plurality of groups, and
the plurality of groups includes a first group and a second group,
wherein
the first communication circuit is configured to:
transmit a reference signal at a determined time via a first frequency channel of the plurality of frequency channels that belongs to the first group; and
receive data in a time zone different from the determined time via the first frequency channel of the plurality of frequency channels,
the second communication circuit is configured to receive the data is via a second frequency channel of the plurality of frequency channels that belongs to the second group, and
a second wireless communication device that includes circuitry is configured to:
transmit the data to the first wireless communication device via a target frequency channel of the plurality of frequency channels;
compare a set threshold and reception power of the reference signal received via the first frequency channel of the plurality of frequency channels that belongs to the first group;
determine a selection of the target frequency channel of the plurality of frequency channels based on the comparison;
retain information associated with a third group of the plurality of groups, wherein the information associated with the third group is contained in the reference signal; and
select the target frequency channel of the plurality of frequency channels from one of the second group or the third group based on the reception power of the reference signal that is lower than the set threshold.

15. An information processing method, comprising:
in a first wireless communication device:
detecting a reference signal, wherein the reference signal is transmitted from a second wireless communication device via a first frequency channel of a plurality of frequency channels that belongs to a first group;
transmitting data to the second wireless communication device via a second frequency channel of the plurality of frequency channels, wherein
the plurality of frequency channels is classified into a plurality of groups, and
the plurality of groups includes the first group and a second group;
comparing a set threshold and reception power of the reference signal received via the first frequency channel of the plurality of frequency channels that belongs to the first group;

determining a selection of the second frequency channel of the plurality of frequency channels based on the comparison;

retaining information associated with a third group of the plurality of groups, wherein the information associated with the third group is contained in the reference signal; and selecting the second frequency channel of the plurality of frequency channels from one of the second group or the third group based on the reception power of the reference signal that is lower than the set threshold.

16. A non-transitory computer-readable medium, having stored thereon, computer-executable instructions which when executed by a processor of a first wireless communication device, cause the processor to execute operations, the operations comprising:

detecting a reference signal, wherein the reference signal is transmitted from a second wireless communication device via a first frequency channel of a plurality of frequency channels that belongs to a first group;

transmitting data to the second wireless communication device via a second frequency channel of the plurality of frequency channels, wherein
the plurality of frequency channels is classified into a plurality of groups, and
the plurality of groups includes the first group and a second group;

comparing a set threshold and reception power of the reference signal received via the first frequency channel of the plurality of frequency channels that belongs to the first group;

determining a selection of the second frequency channel of the plurality of frequency channels based on the comparison;

retaining information associated with a third group of the plurality of groups, wherein the information associated with the third group is contained in the reference signal; and selecting the second frequency channel of the plurality of frequency channels from one of the second group or the third group based on the reception power of the reference signal that is lower than the set threshold.

* * * * *